United States Patent [19]

Hosaka et al.

[11] Patent Number: 4,980,814
[45] Date of Patent: Dec. 25, 1990

[54] SYSTEM FOR CONTROLLING IMAGE FORMATION

[75] Inventors: Masao Hosaka, Sagamihara; Kazutoshi Shimada; Yoshitaka Ogino, both of Kawasaki, all of Japan

[73] Assignee: Canon Kabushiki Kaisha, Tokyo, Japan

[21] Appl. No.: 244,638

[22] Filed: Sep. 12, 1988

Related U.S. Application Data

[63] Continuation of Ser. No. 795,229, Nov. 5, 1985, abandoned.

[30] Foreign Application Priority Data

| Nov. 8, 1984 | [JP] | Japan | 59-234034 |
| Nov. 8, 1984 | [JP] | Japan | 59-234035 |
| Nov. 8, 1984 | [JP] | Japan | 59-234036 |

[51] Int. Cl.[5] .................... G06F 15/46; G06F 15/16
[52] U.S. Cl. .................... 364/131; 355/204; 364/400; 364/200; 364/228.3; 364/229.3; 364/231.4
[58] Field of Search .................... 364/131–136, 364/400, 200 MS File, 900 MS File; 355/35 H, 14 R, 14 C, 200, 202, 203–209; 340/825.06–825.08

[56] References Cited

U.S. PATENT DOCUMENTS

| 3,579,200 | 5/1971 | Davis et al. | 364/900 |
| 3,970,993 | 7/1976 | Finnila | 364/200 |
| 3,980,992 | 9/1976 | Levy et al. | 364/200 |
| 4,111,543 | 9/1978 | Steiner | 355/200 |
| 4,111,544 | 9/1978 | Steiner | 355/200 |
| 4,144,550 | 3/1979 | Donohue et al. | 355/14 C |
| 4,253,148 | 2/1981 | Johnson et al. | 364/200 |
| 4,283,773 | 8/1981 | Daughton et al. | 364/900 |
| 4,375,917 | 3/1983 | Hiraike et al. | 355/14 R |
| 4,410,983 | 10/1983 | Cope | 264/200 X |
| 4,443,861 | 4/1984 | Slater | 364/138 |
| 4,500,951 | 2/1985 | Sugimoto et al. | 364/138 |
| 4,507,726 | 3/1985 | Grinberg et al. | 364/200 |
| 4,532,584 | 7/1985 | Federico et al. | 364/140 |
| 4,689,736 | 8/1987 | Glaudel | 364/132 X |

FOREIGN PATENT DOCUMENTS

| 071777 | 2/1983 | European Pat. Off. |
| 101057 | 2/1984 | European Pat. Off. |
| 104858 | 4/1984 | European Pat. Off. |
| 104887 | 4/1984 | European Pat. Off. |
| 106566 | 4/1984 | European Pat. Off. |
| 132926 | 2/1985 | European Pat. Off. |
| 59-65306 | 4/1984 | Japan |
| 59-65307 | 4/1984 | Japan |

OTHER PUBLICATIONS

Arvid, D. K., et al. "A VLSI Chip For Real-Time Image Processing," IEEE Int. Symposium on Circuits and Systems, 2d: 405–408 (May 5, 1983).
"Built-In I/O Support Beefs Up 16-Bit MumC," Electronic Design, 31:11:153–160 (May 1983).

(List continued on next page.)

Primary Examiner—Joseph Ruggiero
Attorney, Agent, or Firm—Fitzpatrick Cella Harper & Scinto

[57] ABSTRACT

A control system suitable for control of an image forming apparatus such as a copying machine having a plurality of objects to be controlled. This system comprises a plurality of control units to individually and independently control those objects to be controlled, a monitor control unit to monitor those control units, and a system bus which is commonly connected to the control units and monitor control unit. The control units time-sharingly and cyclically execute their control operations by time-sharingly occupying the system bus one by one. The monitor control unit operates in parallel with the control units. The control units and monitor control unit are formed on the same semiconductor substrate consisting of, for example, Si or GaAs. The system bus may be a LAN bus or an optical fiber. With this control system, each control unit can execute its own control operation irrespective of an interruption request, so that the processing program procedure is simplified and a reliability of control is also improved.

24 Claims, 23 Drawing Sheets

OTHER PUBLICATIONS

Davis, G. T. "Distributed Processing Approach to Industrial Automation," IBM Technical Disclosure Bulletin, 26:1:112–113 (Jun. 1983).

Haines, R. "Two MumCs On One Chip Split the Silicon and the Work," Design, 29:10:197–22 (May 14, 1981).

Hannaway, W. "Handling Real-Time Images Comes Naturally to Systolic Array Chip," Electronic Design, 32:2–3:289–300 (Nov. 15, 1984).

Hughes, J. B. "A Versatile ECL Multiplexer IC For the Bbit/S Range," IEEE JL of Solid-State Circuits, SC–14:15:812–817 (Oct. 1979).

"Interfacing/Communications In Distributed Control," Control of Instrumentation, 16:6:83–91 (Jun. 1984).

Kompass, E. J. "A New Universal Bus for Programmable-Controllers," Control Engineering, 28:11:105 (Nov. 1981).

Kondo, T., "An LSI Adaptive Array Processor," IEEE JL of Solid-State Circuits, SC–18:2:147–156 (Apr. 1983).

Tell, R., "Multiplexer AT 5 Gbits/S for Fibre-Optical Communication Systems," Electronics Letters, 13:25:765–766 (Dec. 8, 1977).

Wilson, P. "Thirty-Two Bit Micro Supports Multiprocessing," Computer Design, 23:6:143–50 (Jun. 1984).

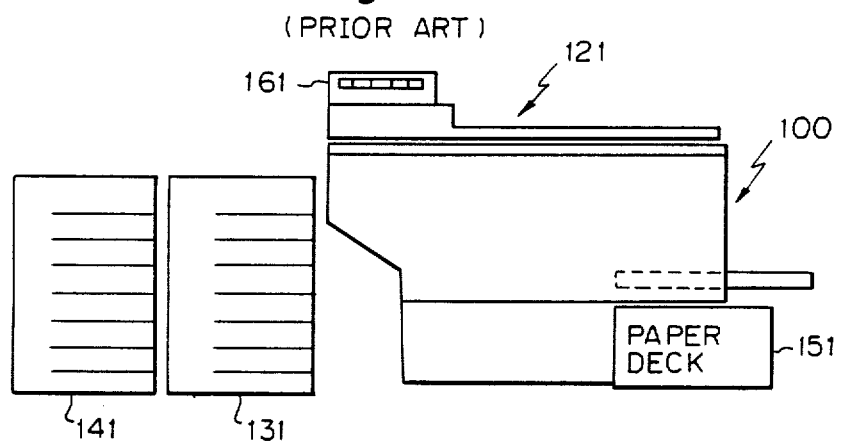
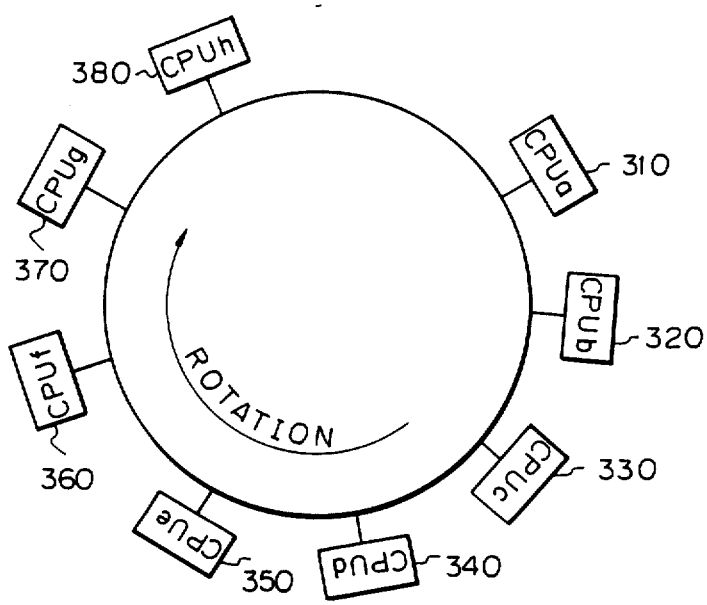

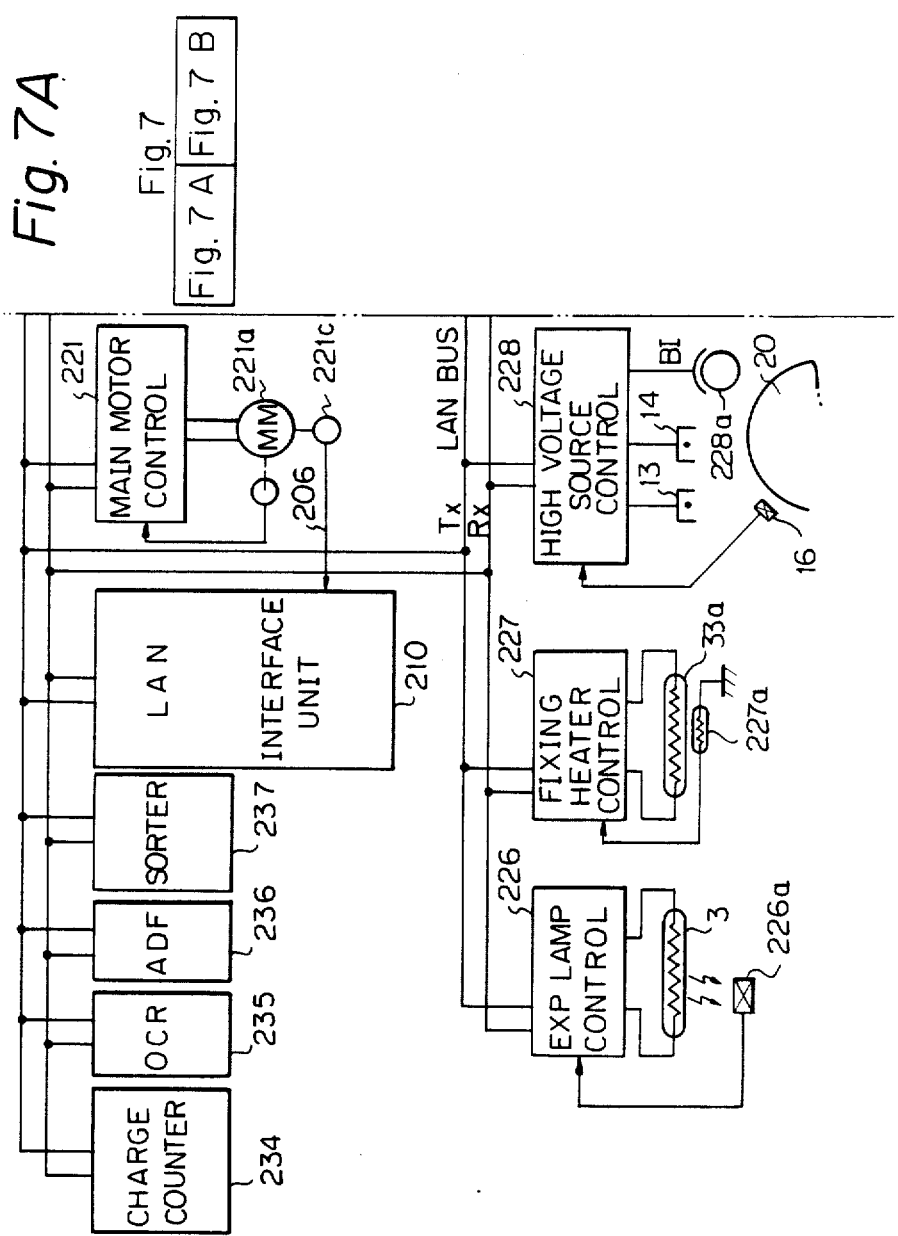

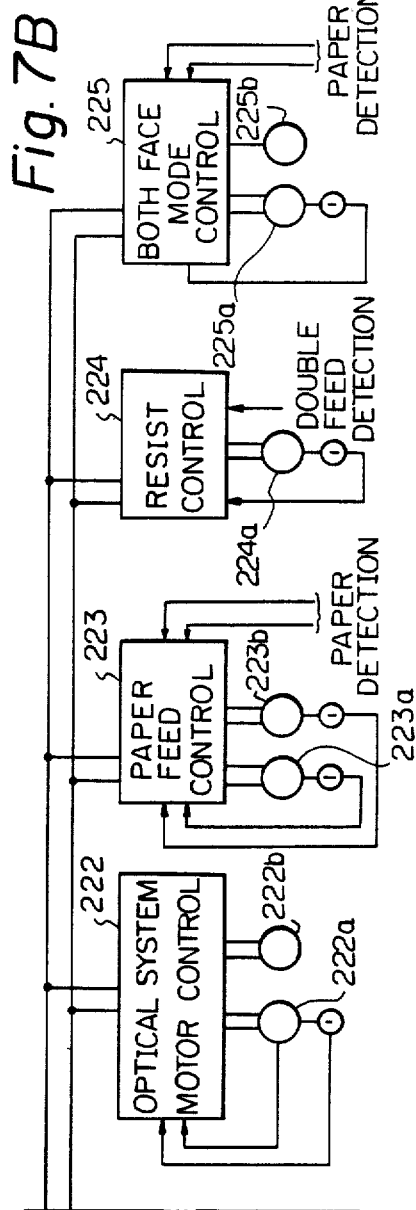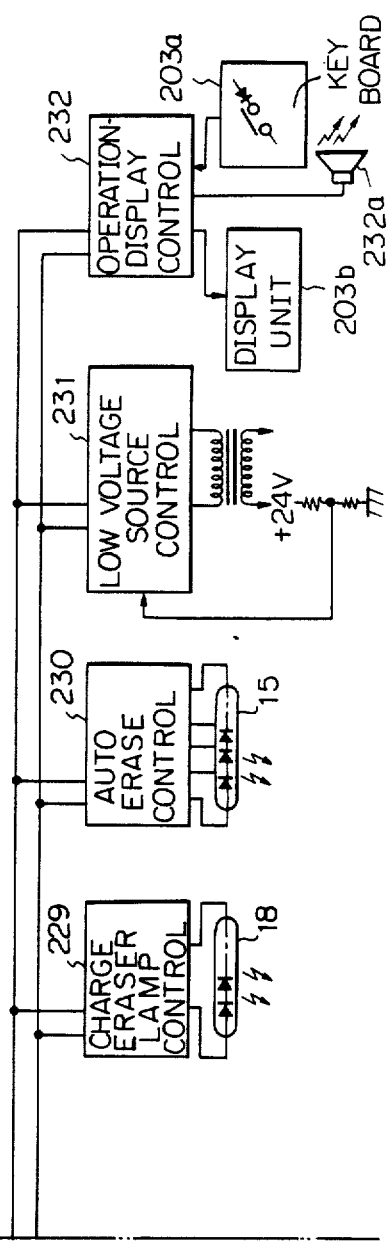
Fig. 7B

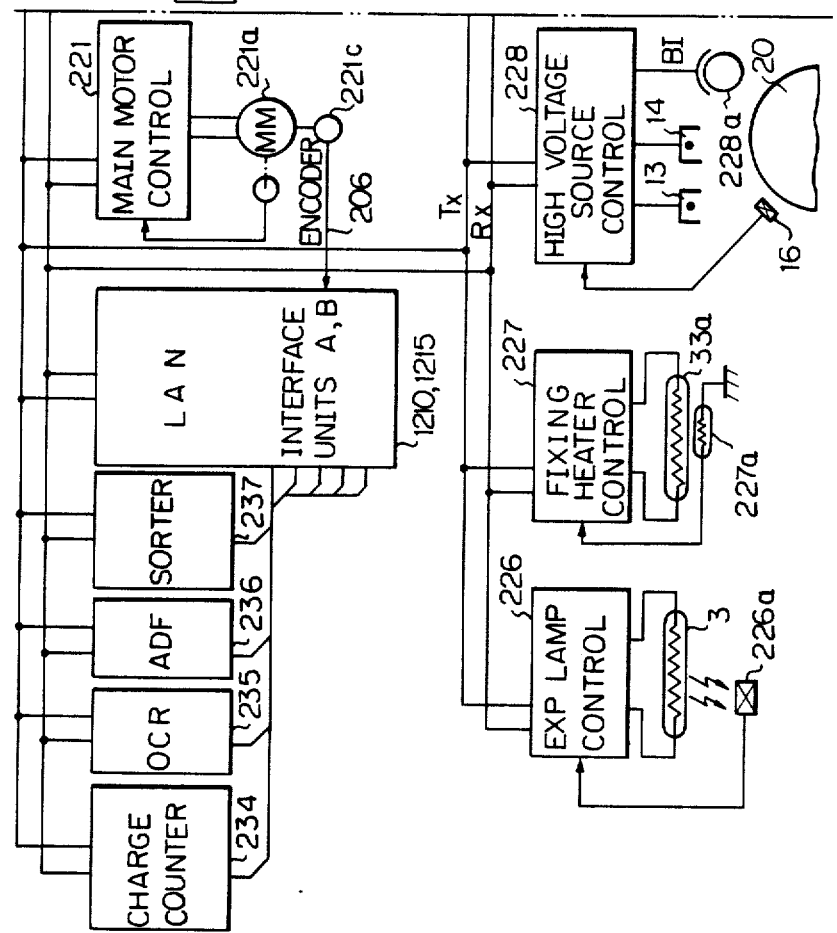

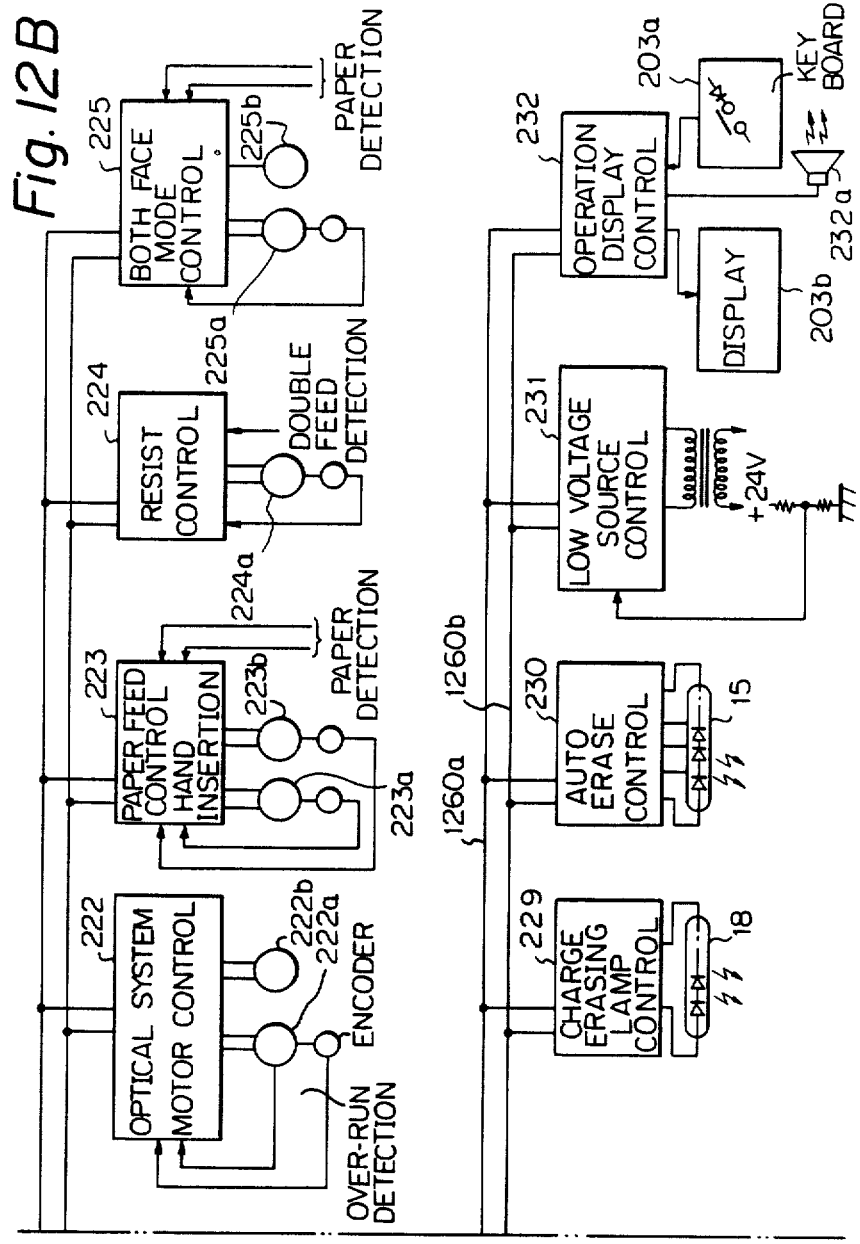

| Fig. 14 A | Fig. 14 B |

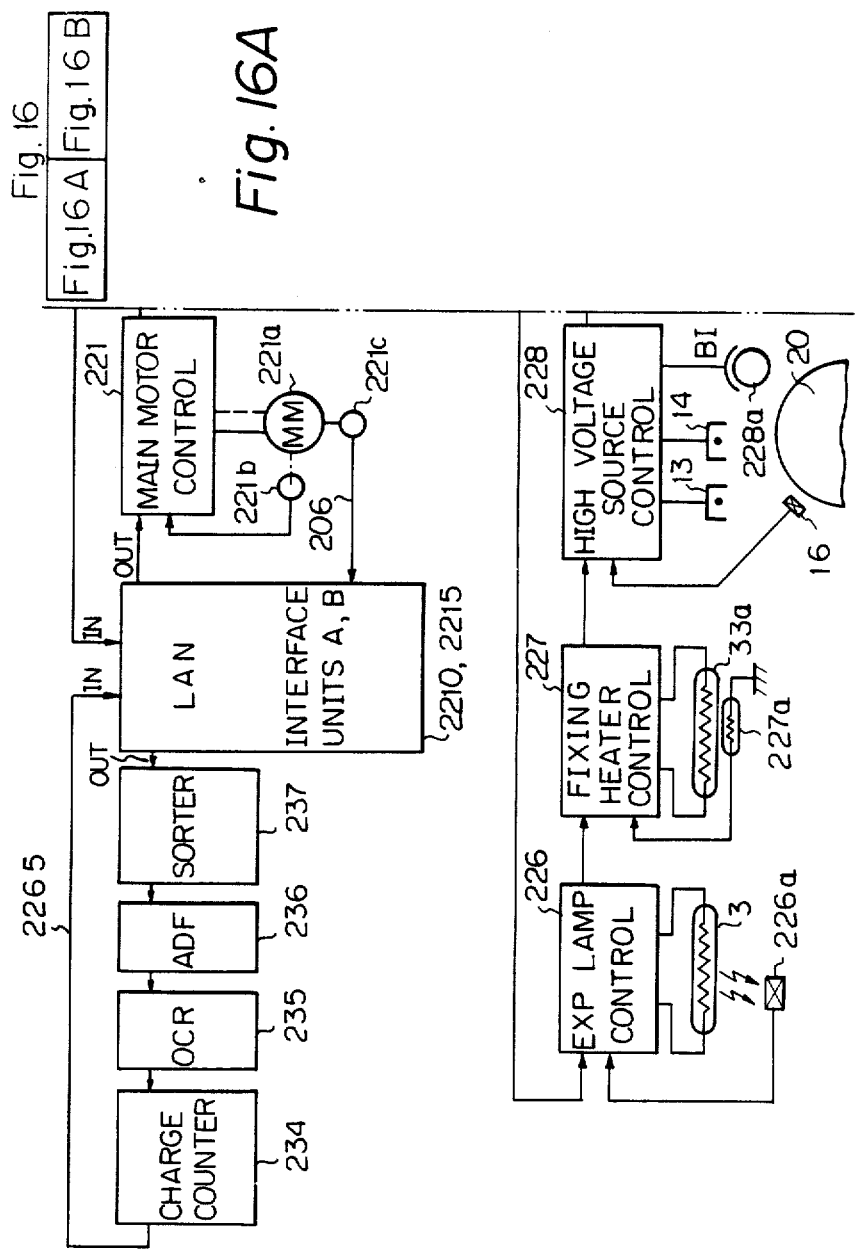

SYSTEM FOR CONTROLLING IMAGE FORMATION

This application is a continuation of application Ser. No. 795,229 filed Nov. 5, 1985, abandoned.

BACKGROUND OF THE INVENTION

1. Field of the Invention

The present invention relates to a control system suitable for control of an image forming apparatus having a plurality of objects to be controlled.

2. Description of the Prior Art

Function of OA equipment have been remarkably improved owing to the double effects of both the recent development of the semiconductor integrated circuit technology and the computer technology. However, the improvement of the functions of OA equipment causes the contents of various functions which are controlled to be complicated and highly advanced, so that a control amount extremely increases and the overhead to input into or output from each load also increases Thus, the more advanced control CPU having a larger bit capacity must be used. In association with this, a hardware constitution becomes complicated and enlarged in size and a software constitution also becomes complicated and advanced, resulting in an increase in product cost.

In addition, complication and enlargement of the hardware constitution increase the number of signal lines in equipment and cause the wirings of the signal lines to be increased and complicated As the control amount increases, the more the number of wirings increases. When the wiring bundles (harnesses) increase in number and size, they can be easily influenced by the induction noises from other signal lines and the equipment is enlarged in size. This enlargement is contrary to a requirement of the user for a reduction in size and weight of the equipment.

FIG. 1 shows an example of a constitution of a conventional copying machine, which is a middle-scale OA equipment.

This copying machine uses a total of six one-chip CPUs for control of each section of the machine, and each one-chip CPU integrally includes cheap ROM, RAM, I/0 control unit, and analog-to-digital (A/D) converter. As these one-chip CPUs, μCOM87AD made by Nippon Electric Co., Ltd. are used.

Objects to be controlled in the copying machine body 100 are distributingly controlled by four one-chip CPUs. A master CPU 110 mainly performs an operation display sequence control 111. A slave CPU-A 112 mainly performs a control 113 of a stepper motor and a developer. A slave CPU-B 114 mainly performs a control 115 of a DC servo motor in a PLL manner A slave CPU-C 116 mainly performs a control 117 of a potential of a photo sensitive material, erasing, and stabilization of a light amount of a halogen lamp for exposure.

On one hand, to control peripheral devices of the machine, a slave CPU-D 120 controls an auto document feeder (ADF) 121 A slave CPU-E 130 controls a sorter 131. Hitherto, those one-chip CPUs are mutually connected by a control bus consisting of a number of signal lines The ADF 121 and sorter 131 are merely connected to the peripheral devices of the machine, so that total six one-chip CPUs including the objects to be controlled of the copying machine body are used.

On the other hand, in the case where a number of sorters 131 are connected in series or where a paper deck (cassette for a large quantity of copy), a charge counter, an OMR, an OCR, etc. are further connected as accessory devices, the number of one-chip CPUs which are used increases in association with those extra devices. With such a system configuration, it is inevitable that the communications among the CPUs become complicated and connections of signals among the CPUs also become complicated. This tendency becomes conspicuous more and more with an increase in number of CPUs for control as the number of external devices which are connected increases.

To prevent this problem, a constant protocol is determined in communications among the CPUs and in the case where some information is sent to the specified slave CPU from the master CPU 110, address information and data information are time-sharingly sent through the bus. However, in this case, the overhead due to the program control is fairly enlarged. On one hand, upon reception as well, a program process must be carried out to decode the received data, so that it also takes a considerable long time for the decoding. As described above, the overhead due to transmission and reception increases, so that a conventional method is inadequate to a response which requires a high speed.

FIG. 2 shows a block arrangement in the case where a system constitution was increased. FIG. 3 shows an example of the arrangement of FIG. 2.

In the diagrams, the same parts and components as those in FIG. 1 are designated by the same reference numerals.

The sorter-I 131 corresponds to the sorter 131 in FIG. 1. A sorter-II 141 is the same as the sorter-I and connected in series A paper deck 151 and a charge counter 161 are also connected.

FIG. 2 shows an example in which the control elements are mutually connected by way of serial communication.

For this purpose, a constant protocol is determined in communication among the CPUs. In the case where some information is sent from the master CPU 110 to the specified slave CPU, the address information and data information are time-sharingly transmitted through the bus. However, the overhead due to the program control extremely increases. In addition, even in the case of reception as well, the program process must be carried out to decode the received data, so that it also takes a fairly long time for the decoding As mentioned above, since the overhead due to the transmission and reception increases, the method of FIG. 2 is improper for a response which requires a high speed.

Hitherto, for the serial communicating function included in a microcomputer, an internal interruption occurs upon transmission and reception and each time the interruption occurs, the CPU interrupts the task which is at present being executed and enters the interruption processing routine. Therefore, in the case where an external interruption or a plurality of interruptions due to communication are simultaneously inputted, the task which is at present being executed has to be interrupted for a long time and the influence due to the interruption cannot be ignored. Therefore, the program must be made in consideration of such a situation with religious care. Further, there is also a situation such that the process is interfered by such multi-interruptions and the control function is adversely influenced. Therefore, it is extremely difficult to change and extend the system configuration which has once been determined.

In addition, a malfunction of the whole apparatus occurs due to the influences of the long signal lines (cables) to connect the CPUs, the time lag of the transmission timing of a signal due to such long lines, and the induction noise due to other signal lines or external circumstances, resulting in a reduction in reliability of the apparatus, or the like.

SUMMARY OF THE INVENTION

It is an object of the present invention to provide a system for controlling image formation in which the above-mentioned drawbacks are eliminated.

Another object of the invention is to provide a system for controlling image formation in which a plurality of objects to be controlled are certainly controlled by way of a simple control procedure.

Still another object of the invention is to provide a system for controlling image formation in which even when the number of objects to be controlled increases or decreases, control data lines among the objects to be controlled can be easily wired and it is also possible to easily cope with a change in system configuration.

Practically speaking, it is a specific object of the invention to provide a system for controlling image formation in which a plurality of control units to independently control each of a plurality of objects to be controlled execute time-sharingly their control operations.

Still another object of the invention is to provide a system for controlling image formation in which a plurality of control units to individually and independently control a plurality of objects to be controlled, transmission control units to transmit control data from the control units to external control execution units, and monitor control units to concentratedly monitor the plurality of control units are integrally formed on a semiconductor substrate.

Still another object of the invention is to provide a control system comprising: a plurality of control execution units to individually and independently control a plurality of objects to be controlled; a plurality of transmission lines to transmit data to control the control execution units; a plurality of input/output interface units provided for each of those plurality of transmission lines; and a central control unit to control those plurality of I/0 interface units.

The above and other objects and features of the present invention will become apparent from the following detailed description and the appended claims with reference to the accompanying drawings.

BRIEF DESCRIPTION OF THE DRAWINGS

FIG. 3 is an arrangement diagram of a conventional middle-scale copying machine;

FIG. 6 is a diagram showing the operation procedure of each CPU in the main control unit 200 of the first embodiment;

FIG. 7, consisting of FIG. 7A and 7B, is an arrangement diagram of each control system of the first embodiment;

FIG. 12, consisting of FIG. 12A and FIG. 12B, is an arrangement diagram of each control system of the second embodiment;

DETAILED DESCRIPTION OF THE PREFERRED EMBODIMENTS

An embodiment of the present invention will now be described in detail hereinbelow with reference to the drawings.

Figure 4:
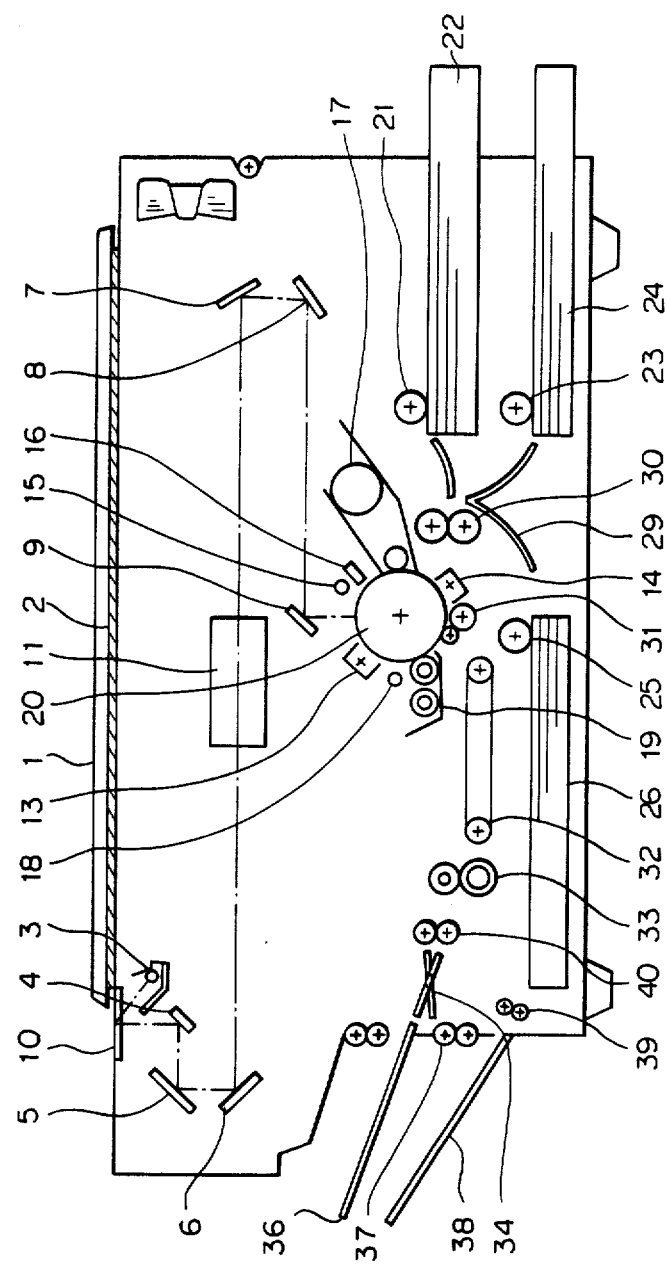
FIG. 4 is a schematic cross sectional view of a mechanism section of a copying machine of one embodiment according to the present invention.

FIG. 4 is a schematic cross sectional view of a mechanism section of a desk-type automatic both face copying machine of one embodiment according to the present invention.

The functions of this embodiment are mainly constituted by four blocks of paper feed and conveying system, exposure system, image formation system, and control system. The operation of the embodiment will then be described hereinbelow with reference to FIG. 4.

When copying, the user first opens an original plate cover 1 and sets an original (document) on it. In the case of reducing or enlarging the original image, a variable magnification is set as necessary using a variable magnification key of an operating section (not shown). Further, a copy quantity, auto or manual operation of a concentration, and one-face or both-face copy mode are respectively selected by the relevant keys of the operating section.

In the case of performing the both-face copy, the copy mode is set to the both-face and a copy start key of the operating section is depressed. Thus, a halogen lamp 3 is lit on and subsequently a photo sensitive drum 20 starts rotating and a charge corona 13 is energized, thereby charging the drum 20. The halogen lamp (exposure lamp) 3 and a first mirror 4 are the same structure and scan an original surface 2 synchronously with the rotation of the drum 20. An original image is formed on the surface of the drum 20 along an optical axis consisting of the first mirror 4, a second mirror 5, a third mirror 6, a zoom lens 11, a fourth mirror 7, a fifth mirror 8, and a sixth mirror 9, so that a latent image is formed on the surface of the drum 20. Subsequently, the surface potential of the portion on the surface of the drum 20 where no latent image is formed is removed by an eraser lamp 15 in accordance with the paper size. Thereafter, the surface of the drum 20 on which the latent image was formed reaches a developing unit 17 and the toner is deposited on the latent image on the drum surface in accordance with the potential thereof, so that the latent image appears.

On one hand, a paper cassette 22 or 24 is selected and a transfer paper is fed by a corresponding paper feed roller 21 or 23 from the selected cassette. This transfer paper stands by for feeding by resist rollers 30. The resist roller 30 rotates at a predetermined timing synchronized with the rotation of the photo sensitive drum 20 and the position of the transfer paper is aligned with the image on the surface of the drum 20. Next, a transfer corona 14 is energized, so that the image on the drum surface is transferred onto the transfer paper. The transfer paper is then separated from the drum 20 by a paper separating roller 31 and conveyed to a fixing unit 33 by a paper conveying belt 32. The transfer paper is heated and pressed by the fixing unit 33, so that the toner is melted and adhered onto the transfer paper.

In this case, since the copy mode is set to the both-face copy mode, the transfer paper is led to paper delivery rollers 37 by way of a paper guide plate 34 and is once brought onto a both face paper delivery plate 38. This paper then slides down due to the weight of itself and reaches rollers 39 The paper is then delivered by the rollers 39 and stocked in an intermediate cassette 26. The transfer papers are not stocked on the plate 38 but slide down one by one.

In this manner, the papers whose front surfaces have been copied as many as a preset quantity are sequentially stocked in the intermediate cassette 26. On the other hand, the image on the surface of the drum 20 after completion of the transfer is removed in a cleaning unit 19 and the drum surface is cleaned. Thus, the residual toner deposited on the drum surface is removed. Further, the light of a charge eraser lamp 18 is irradiated onto the drum surface, thereby removing the residual potential on the drum surface. Next, the drum surface 20 is newly charged by the charge corona 13 and a predetermined surface potential is developed on the drum, thereby enabling a new image to be formed.

Next, after completion of the copy of one side (front surface) of the papers as many as the specified quantity, the operator changes the original image of the original surface 2 and performs the next copy operation (back surface copy).

After the original has been set, when the copy start key in the operating section (not shown) is depressed, the copy operation of the back surface is started. An intermediate paper feed roller 25 rotates at a predetermined timing synchronized with the rotation of the photo sensitive drum 20, so that a transfer paper is fed from the intermediate cassette 26. This paper is reversed upside down by a guide plate 29 and interposed between the resist rollers 30 The paper stands by until a start signal is inputted at a predetermined timing to align the paper with the point of an image which is formed on the drum surface.

The resist rollers 30 rotate at a predetermined timing to align the point of the image and the image formed on the drum 20 is transferred. At this time, the transfer corona 14 is energized at a predetermined timing and the image is transferred on the back surface. The paper is separated from the drum 20 by the paper separating roller 31 and conveyed to the fixing unit 33 by the conveying belt 32. The toner deposited on the transfer paper is melted and adhered by the fixing unit 33. The transfer paper is then interposed between rollers 40. The guide plate 34 then serves to lead the paper to a paper delivery plate 36 since the back-side copy has already been finished The transfer paper in which both surfaces were copied is stocked on the paper delivery plate 36. In this manner, the process for both-face copy is completed.

In the case of the normal copy mode of only one side, the paper fed from the cassette 22 or 24 is conveyed as a white paper (namely, the copy is not performed) to the intermediate cassette 26 since only the paper conveying system is energized. At this time, the operation of the image formation system is not performed at all but only the conveying system operates to feed the paper from the cassette 22 or 24 and convey it to the intermediate cassette 26.

On one hand, this embodiment is provided with an automatic exposure function to improve a copy quality. According to this function, the potential of the photo sensitive surface of the drum 20 is controlled to become a constant value and thereby making it possible to always obtain a good concentration irrespective of concentration of the original.

Before starting the copy, the surface potential is first monitored. Practically speaking, the lights reflected from a standard reflecting plate 10 are irradiated onto the drum 20 and the surface potential produced at this time is monitored by a surface potential sensor 16, thereby first controlling the corona voltage of the charge corona 13 so that the surface potential becomes a proper value. In copy operation, when the user selects the auto copy concentration mode, the optical system prescans the original to monitor the original concentration and sets the corona voltage and bias value. In the case where the prescanning operation is annoyance because such a monitor is needed to be executed for every copy, a value of the development bias may be controlled so that a proper concentration is derived while successively monitoring the original concentration in a realtime manner.

In the case of the continuous copy (in the case where a plurality of papers are copied from the same original), the concentration can be set to a proper value from the second paper by controlling the corona voltage and a light quantity of lamp.

In this embodiment, as shown in FIG. 3, an automatic document feeder (hereinafter, referred to as an ADF), a leader or collator, a paper deck, a charge counter, etc. can be connected to the copying machine body shown in FIG. 4.

Figure 5A:
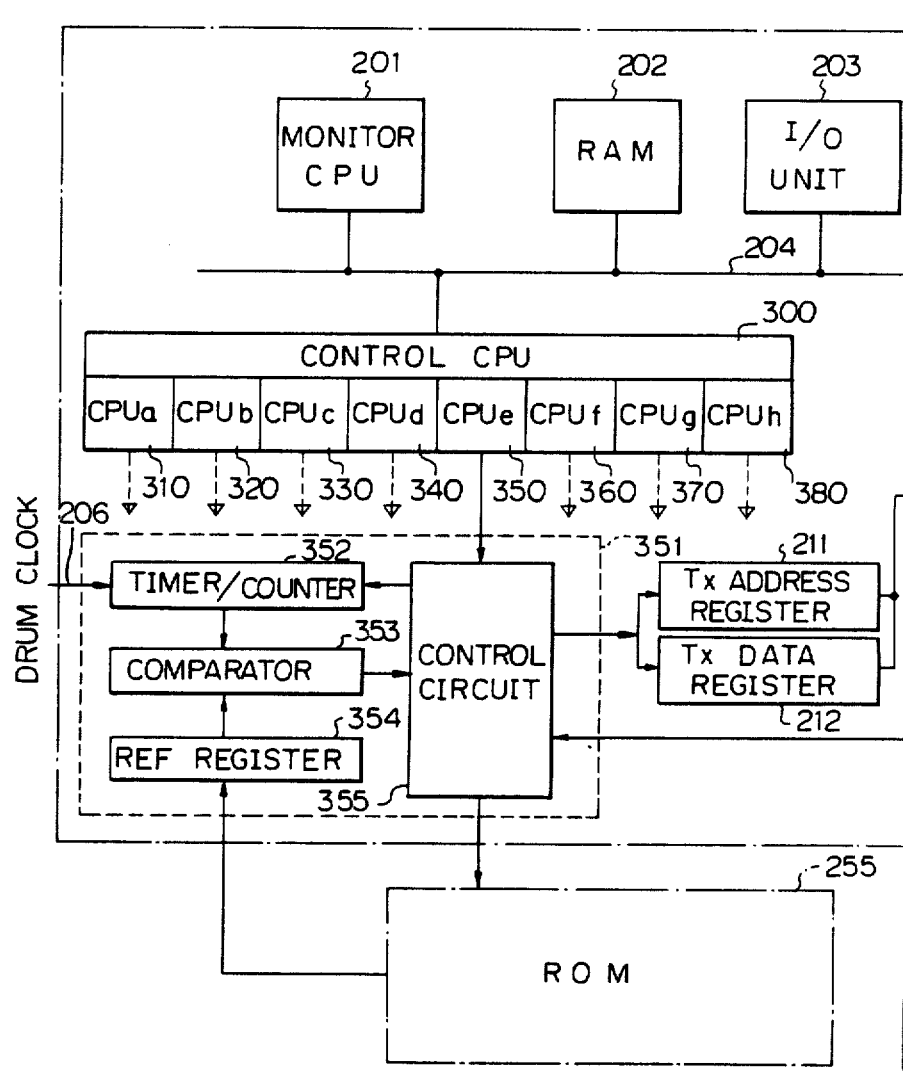
FIG. 5, consisting of FIG. 5A and FIG. 5B, is block diagram of a main control unit 200 of the first embodiment of the invention.
Figure 5B:
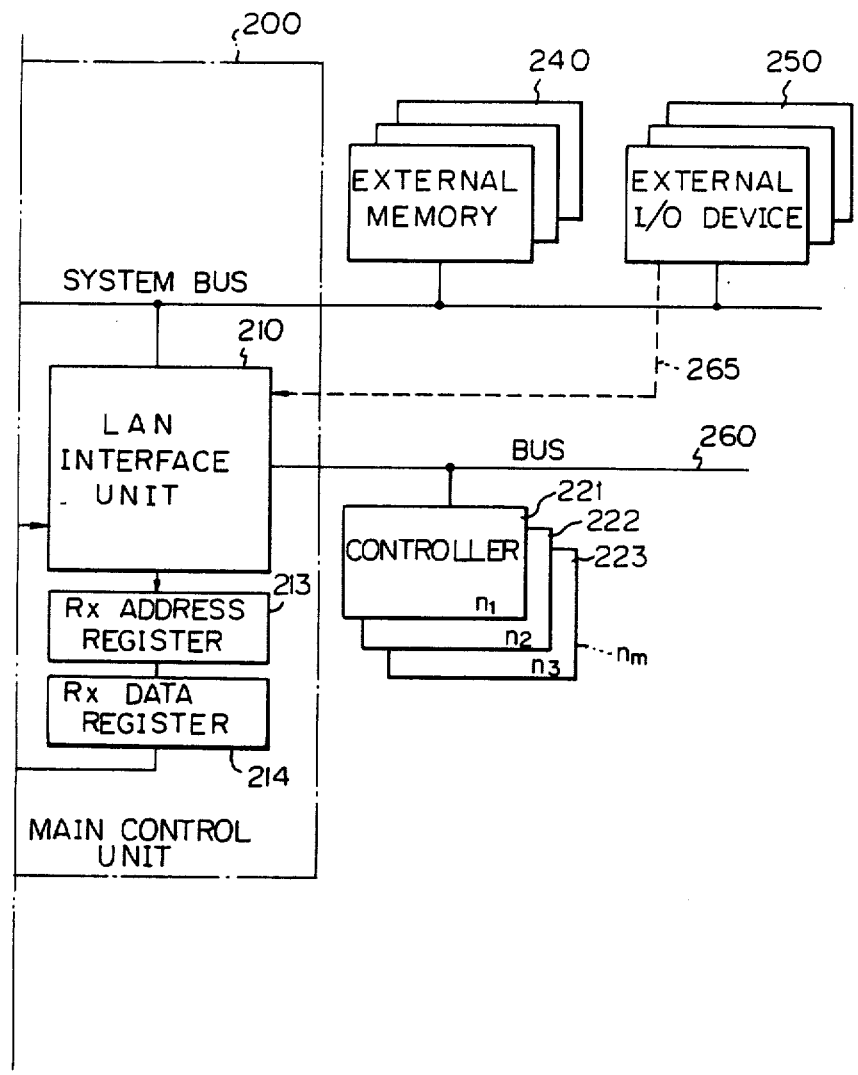

FIG. 5 shows a block diagram of control functions of the first embodiment.

In FIG. 5, reference numeral 200 denotes a main control unit of the copying machine, and 221 to 223 are controllers $n_1$ to $n_3$ to control the operation of each constitution of the copying machine under the control of the main control unit 200 Although three controllers are shown as examples in FIG. 5, only an arbitrary number of controllers for extension can be connected to a LAN bus 260 from a LAN interface unit 210 in the main control unit 200. Numeral 240 indicates an external memory for extension which can be directly connected to a system bus 204 of the main control unit 200, and 250 represents an external input/output (I/O) device which can be connected to the system bus 204.

In the main control unit 200, reference numeral 201 denotes a monitor CPU to control the whole system including a CPU 300 of the control system and a schedule for execution of the process; 202 is a random access memory (RAM); 203 an input/output (I/O) unit such as an operating input unit to operate the copying machine or the like; 204 the system bus; 210 the LAN interface unit serving as an interface among external controllers $n_l$ to $n_m$; and 211 and 212 a Tx address register and a Tx data register for allowing the control CPU 300 to send control data through the LAN interface unit 210 to external controllers An Rx address register 213 and an Rx data register 214 serve to allow the control CPU 300 to receive the data which was sent from the external controller to the LAN interface unit 210 through the LAN bus 260. The control CPU 300 executes each task process on the basis of the control of the monitor CPU 201 and is constituted by total eight CPUs 310 to 380 (i.e., CPU a to CPU-h). The number of CPUs of the control CPU 300 can be freely increased or decreased as necessary. As the case of the CPU-e 350 is representatively shown in FIG. 5, each control CPU is provided with a dedicated reference register (hereinafter, referred to as a REF register) 354, a timer/ counter 352, a comparator 353, and a control circuit 355. As well as the monitor CPU 201, control CPU 300, and LAN interface unit 210, the circuits constituting the main control unit 200 are all together constituted on the same one-198 chip semiconductor substrate.

To prevent the competition in the case where the control CPU 300 and monitor CPU 201 access the RAM 202 and I/O unit 203, the time when each CPU occupies the system bus 204 is sequentially and time-sharingly set as shown in FIG. 6. The CPU-a 310 to CPU-h 380 cyclically and time-sharingly operate in a clockwise manner. In this case, each CPU possesses the system bus 204 for eight μsec and one rotation equals eighty μsec. The monitor CPU 201 operates in parallel during this period of time. Therefore, when 80 μsec is considered as a unit, the CPU-a to CPU-h operate in parallel.

The LAN interface unit 210 has a control register and a working register (not shown) and has a function to control the communication of data with the external controllers (221 to 223) or the like through the LAN bus 260 in accordance with a predetermined protocol. In this embodiment, in addition to the monitor CPU 201, the small-scale control CPU 300 is assigned for every execution level of each task process and each CPU independently executes the control process. The monitor CPU 201 executes the control of start and stop of the task processes of the respective CPUs of the control CPU 300, designation and change of the execution tasks, and the like. Also, only when a request is generated from the CPUs, the monitor CPU 201 executes the process according to the request.

The relations among the CPUs in the main control unit 200 and the LAN interface unit 210 will then be described.

In FIG. 5, the CPU-e 350 which executes the task of the sequence control will be described as an example hereinbelow.

If the copy conditions are satisfied when the user depresses the copy start key, the system enters the copy execution cycle. In the case of the copying machine, a drum clock 206 which is generated due to the rotation of the photo sensitive drum 20 is counted and various kinds of controls are executed synchronously with the drum clock 206. The drum clock 206 is sequentially counted by the timer/counter 352 of the CPU-e 350. A count value of the timer/counter 352 and a value which is read out from a ROM 255 as necessary by the control of the control circuit 355 and is set into the REF register 354 are compared by the comparator 353. When those values coincide, the next control operation is executed. The readout from the RAM 255 into the REF register 354 is performed by way of a DMA.

FIG. 7 is an arrangement diagram of showing respective objects to be controlled which were connected to the main control unit through the LAN bus 260 of the embodiment. The objects to be controlled of the copying machine are divided into twelve blocks and the controller of each block is connected to the LAN bus 260. The LAN bus 260 is constituted by two signal lines of an output signal line Tx 260a from the LAN interface unit 210 and an input signal line Rx 260b to the LAN interface unit 210.

The main motor control 221 controls a main motor 221a of the copying machine. The main motor 221a drives the conveying system of the drum 20. In this embodiment, a DC servo motor is used as the main motor. The timing clock pulse (drum clock) signal 206 is generated synchronously with the rotation of the drum 20 and is sent to the timer/counter (e.g., 352) of the LAN interface unit 210. An optical system motor control 222 controls a scan motor 222a as a servo motor of an original and a pulse motor 222b to set a magnification. The positions and speeds of those motors are controlled by the optical system motor control 222 on the basis of the data from the control CPU 300 in the main control unit 200. Before the copy operation is performed, a variable (reduction, enlargement, zoom) magnification is set by the pulse motor 222b on the basis of a command from the control CPU 300. The user instructs and inputs the value of the magnification from the operating section.

The paper feed control 223 controls DC motors 223a and 223b to rotate the paper feed roller 21 or 23 at a predetermined timing. The control 223 also detects the presence or absence of the paper in the feed cassette 22 or 24, the paper jam, and the like and transmits the direction data to the control CPU 300. A resist control 224 controls a resist motor 224a to drive the resist rollers 30 and controls the image edge registration of the image on the surface of the drum 20 and the transfer paper, and the bending (loop) of the paper, and also detects the double feed (i.e., two papers are simultaneously fed). A both-face mode control 225 controls an intermediate paper feed roller motor 225a to drive the paper feed roller 25 and thereby feeding the transfer paper. When the user sets the both-face copy mode, the paper in which one side has completely been copied in a manner as described above is sent to the intermediate cassette 26 and after completion of the one-side copy of the papers as many as the specified quantity, the paper is fed from the cassette 26 by the roller 25. The both-face mode control 225 drives a guide plate control solenoid 225b to control the direction of the guide plate 34 and also detects the presence or absence (paper jam, presence or absence of the paper) of the transfer paper which is fed in the both-face copy mode.

An exposure (EXP) lamp control 226 stabilizes a light quantity of the halogen lamp 3 and controls the light adjustment. The light quantity of the lamp 3 is detected by a photo sensor 226a. The photo sensor 226a is arranged on the side surface of the halogen lamp 3 and continuously monitors the brightness of the lamp 3. A fixing heater control 227 controls a heating temperature of a fixing heater 33a of the fixing unit 33. This temperature is detected by a thermistor 227a arranged near the fixing heater 33a and the driving electric power of the heater 33a is controlled on the basis of the detected temperature A high voltage source control 228 measures the detected potential of the surface potential sensor 16 arranged near the drum 20 and controls the voltages of the charge corona 13, transfer corona 14, and a bias voltage source BI 228a so that the surface potential of the drum 20 becomes constant in both the bright and dark portions. A charge eraser lamp control 229 controls an irradiation amount of light of the charge eraser lamp 18 to erase the charges on the drum surface In the case where the image on the drum surface is not transferred onto the transfer paper because of occurrence of paper jam in the transfer unit or the like upon feeding of the paper, or the like, the irradiation amount of light from the lamp 18 is increased, thereby irradiating the high-power light onto the drum surface.

An auto erase control 230 controls an area where the eraser lamp 15 is lit on in accordance with the size of transfer paper to be copied and with the magnification and erases the charges in the area other than the image transfer area of the surface of the drum 20, thereby preventing the toner from being deposited on the surface in the non-transfer area. A low voltage source control 231 regulates the power source voltage of DC 24 V and monitors the abnormal value such as an excessive current or the like, and the like An operation-display control 232 serves as a man-machine interface and controls the key inputs from a keyboard 203a of the I/O unit 203 through the control CPU 300 and LAN interface unit 210, the display of a display unit 203b, and the audio output from an audio output unit 232a using an audio synthesizer included in the control 232.

In this embodiment, further four optical units are provided as peripheral devices which can be connected to the LAN bus 260: namely, a charge counter 234, an OCR/OMR reading apparatus (OCR) 235, an auto document feeder (ADF) 236, and a sorter 237. In the case where a problem is caused in the response speed when the control is performed using only the LAN bus 260 among them, a LAN interface is newly provided in the main control unit 200 and used as the LAN interface only for use of the peripheral devices Two sets of Rx and Tx registers which can control two LAN interfaces may be provided in the control CPU 300.

The LAN transmission control unit of each control unit will then be described with respect to the main motor control 221 shown in FIG. 7 as an example. Each of the other control units is also constituted and controlled in substantially the same manner as the main motor control 221.

Figure 8:
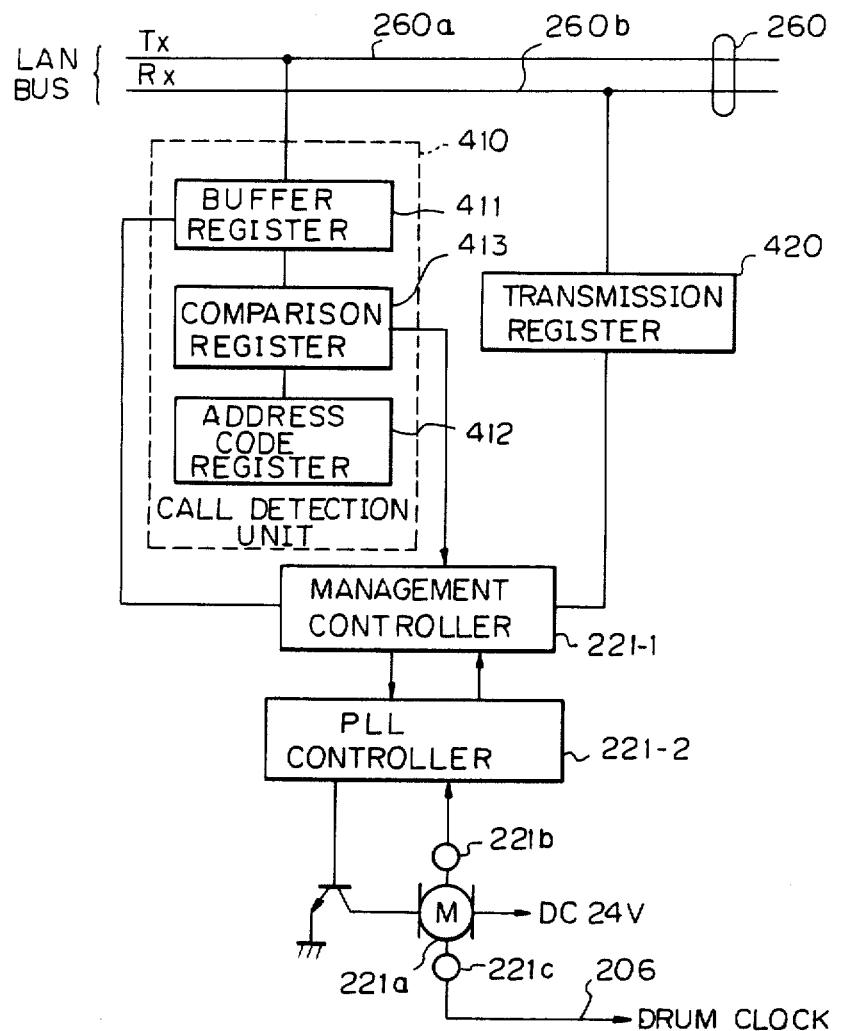
FIG. 8 is a block arrangement diagram for a main motor control.

FIG. 8 is a block diagram mainly showing the transmission control unit of the main motor control 221. In the diagram, reference numeral 410 denotes a call detection unit comprising: a buffer register 411 which always receives communication data on the Tx line 260a of the LAN bus 260; an address code register 412 which sets and holds a peculiar address value in the self-control; and a comparison register 413 to compare the address code value in the communication data stored in the buffer address register 411 with the address code value set in the address code register 412. When it is determined in the comparison register 413 that those address code values coincide, it outputs an interruption request to a management controller 221-1 and takes in the data of the transmission frame in which the address code to the self-control was set and which was received in the buffer register 411. A PLL control unit 221-2 to drive the main motor is controlled in accordance with the above-mentioned reception data.

In the case where the data which is transmitted to the control CPU 300 exists with respect to the reception data, this transmission data is set into a transmission register 420 and the content of the register 420 is transmitted to the Rx line 260b of the LAN bus 260. For this transmission data, there are two kinds of data: one is the data indicative of a request for transmission (for example, status data of the control system) which is transmitted in the case where, e.g., a request for transmission of a constant data is generated from the control CPU 300; and the other is the data indicative of the abnormal state which is transmitted in the case where some accidents occurred. In this manner, a request for reception of the communication data to the self-apparatus is generated to the management controller only when the transmission frame to the self-control is sent by the call detection unit 410 (provided for all controls). Therefore, the management controller does not need to monitor the communication data to the other control during that interval and can execute only its own control process.

On one hand, it is sufficient that the control CPU 300 also controls only the controller which was set and specified in the Tx address register 211, so that the CPU 300 can execute only its own task process without taking account of the interruption request process from the other controller or the like. Therefore, the processing program procedure also becomes simple and has a high reliability.

In FIG. 8, the management controller 221-1 outputs a start/stop signal of the main motor 221a to the PLL controller 221-2 and controls the rotation period of time of the main motor 221a. The PLL controller 221-2 rotates the motor in response to the start/stop signal and receives a clock pulse signal for control of the speed and position which is generated from a speed controlling encoder 221b in correspondence to the rotation of the motor. The PLL controller 221-2 keeps the rotating speed constant on the basis of the clock pulse signal and also outputs the position control data to the management controller 221-1.

On the other hand, the drum clock pulse 206, which is generated synchronously with the rotation of the drum 20, is generated from an encoder 221c arranged at the other end of the main motor 221a. This clock pulse is inputted to the main control unit 200 through another sole signal line different from the LAN bus 260 and inputted to the timer/counter 352 or the like.

Figure 9:
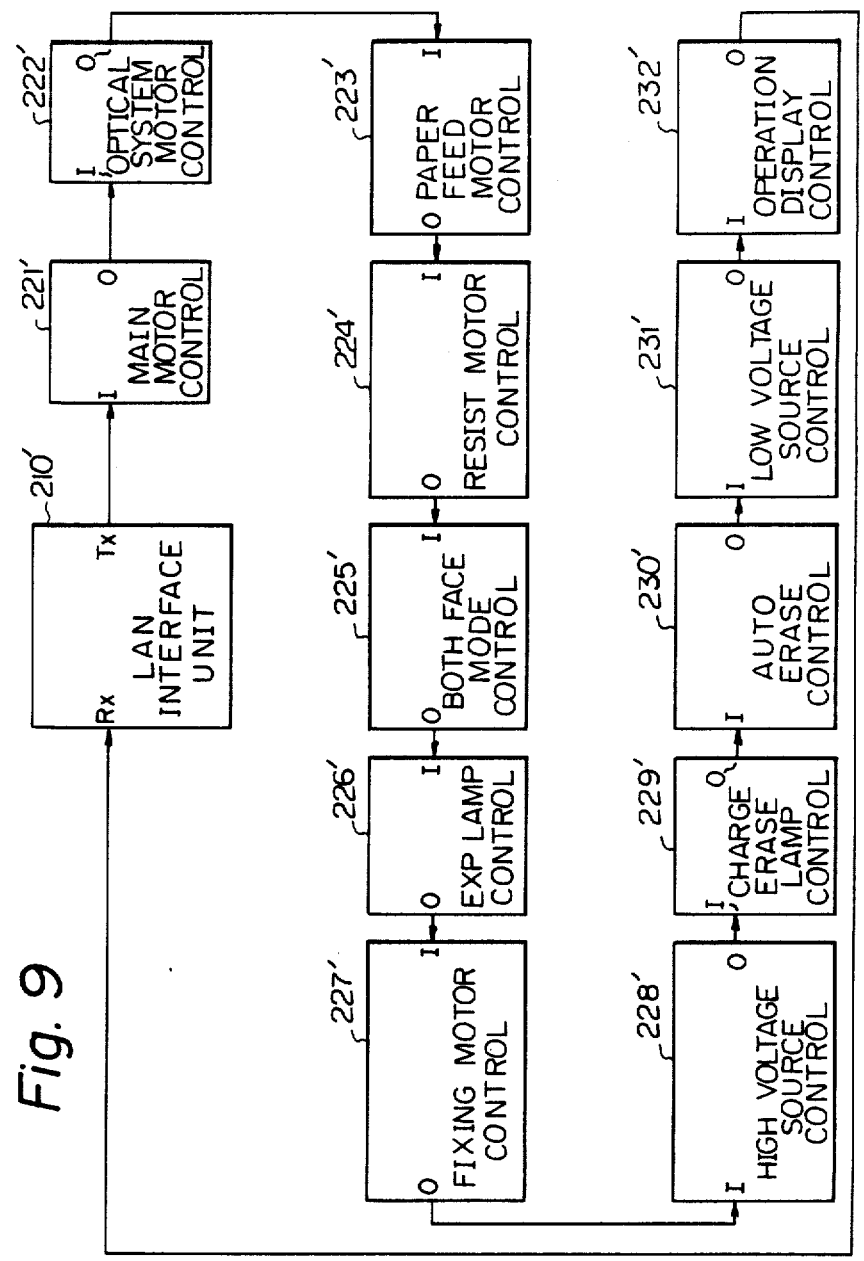
FIG. 9 is a LAN bus arrangement diagram using daisy chain of a modified form of the first embodiment.

Although the above description relates to an example whereby two communication media for transmission (Tx) and reception (Rx) are used as the LAN bus 260, even when a signal line is connected like a loop by way of a daisy chain system as well, a similar effect can be derived if a proper protocol is preliminarily determined. An example of connection by way of such a daisy chain system is shown in FIG. 9.

According to this system, the mutual communication can be realized by a single line instead of two transmission and reception lines.

Figure 10:
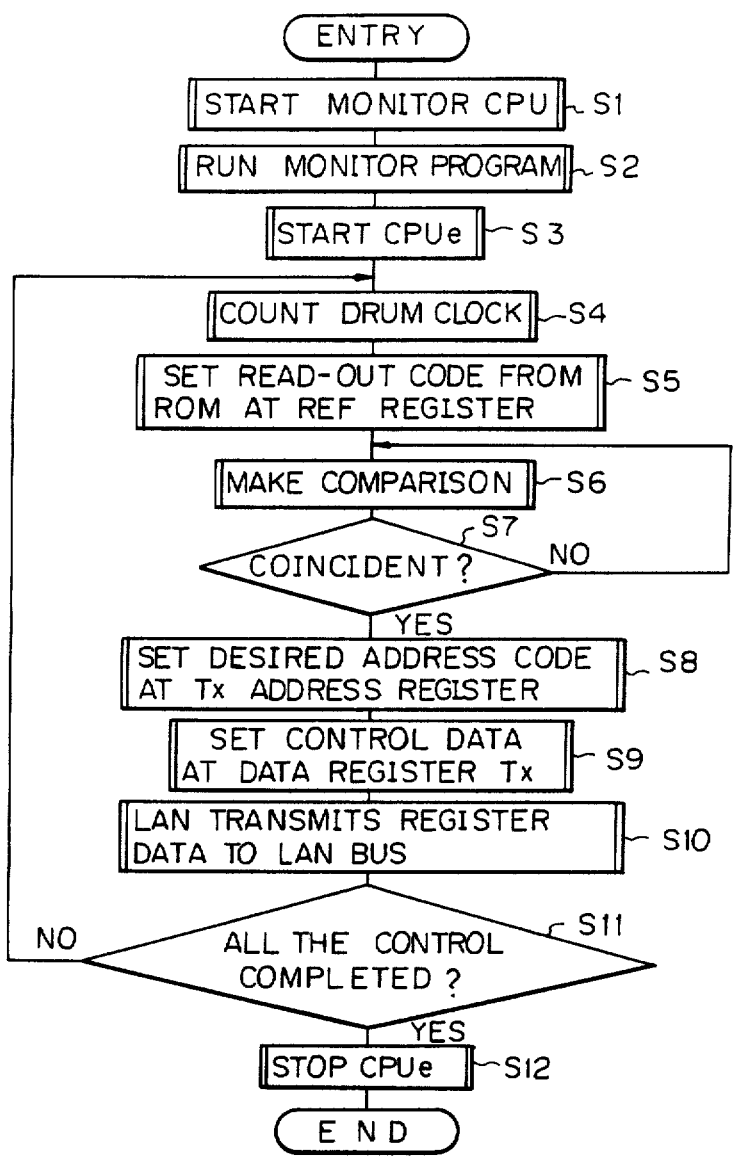
FIG. 10 is a control flowchart for an EXP lamp control of the first, embodiment.

FIG. 10 is a flowchart for the control operation regarding the EXP lamp control 226 The control procedure for the control through the LAN interface unit 210 and LAN bus 260 will then be described with reference to FIG. 10.

When the power source is turned on in this embodiment, the monitor CPU 201 in the main control unit 200 first starts a predetermined control in step S1. A monitor program is then executed in step S2. For example, when the copy start key of the keyboard 203a is depressed in that state, the halogen lamp (exposure lamp) 3 is needed to be lit on. The monitor CPU 201 instructs and actuates the CPU-e 350 to light on the halogen lamp 3 in step S3.

Simultaneously, the other control CPU 300 actuates the main motor control 221 to rotate the main motor 221a. The drum clock 206 is sent in association with the rotation of the motor 221a. The CPU-e 350 starts counting the drum clock 206 by way of the timer/counter 352 in step S4. In the next step S5, the code data indicative of the light-on timing of the halogen lamp 3 is read out from the ROM 255 and set into the REF register 354. In the subsequent steps S6 and S7, the comparator 353 compares the value of the REF register 354 with the count value of the drum clock pulse 206 of the timer/counter 352 and a check is made to see if they coincide or not. When those values coincide, step S8 follows and the address code of the EXP lamp control 226 is set into the Tx address register 211 in order to instruct the control 226 to light on the halogen lamp 3. Then, the control data (in this case, the light-on control data and light adjustment data of the halogen lamp 3) are set into the Tx data register 212 in step S9. When both transmission data are set into the Tx address register 211 and Tx data register 212, the LAN interface unit 210 executes the transmission control to transmit both data from the LAN bus 260 in step S10.

The control data transmitted to the LAN bus 260 is determined to be the transmission data to the selfcontrol by the call detection unit in the EXP lamp control 226 and is taken in. The halogen lamp 3 is lit on in accordance with the control data stored in the Tx data register 212 A predetermined brightness is kept in accordance with the light adjustment data. The brightness is detected by the photo sensor 226a and converted into an electrical signal proportional to the intensity of the received light by the photo sensor 226a. This analog electrical signal is converted to a digital signal and a value of this digital signal is compared with the light adjustment data sent A control is made so that they coincide.

After the CPU-e 350 set the control data in the Tx data register 212 in step S9, it checks whether the task process which is being executed, namely, all the control for the EXP lamp control 226 have been completed or not in step S11. Unless it is completed, the processing routine is returned to step S4 and the counting of the drum clock 206 is continued. Further, in step S5, the timing code for the next control is read out from the ROM 255. In this case, for example, the code data indicative of the light-off timing of the halogen lamp 3 is read.

In this manner, the task processes instructed to the CPU-e 350 by the monitor CPU 201 are sequentially executed. After completion of the execution of all processes, step S12 follows step S11 and the CPU-e 350 informs the end of task process to the monitor CPU 201 and stops the operation and then waits for actuation from the monitor CPU 201.

As described above, the connection among the main control unit 200 and the other control units can be realized by only one or two communication media.

In this embodiment, the peripheral devices (234 to 237) can occupy the LAN bus 260 by requesting the interruption to the LAN interface unit 210 independently of the other controls. The interruption requests can be sent through an interruption request signal line 265 shown in FIG. 5.

Each control unit and peripheral devices can independently control the system to be controlled on a unit basis and can perform the standard control (fail-safe) even if the communication from the main control unit 200 stops for a short time.

In association with such a stop of communication, the error during this period increases in the case of equipment with a high processing speed; however, an influence due to this error can be almost ignored in the case of middle-speed equipment (for example, the copying capability is below 40 papers per minute) or the like.

As described above, according to the first embodiment of the present invention, a plurality of control units which independently and respectively control a plurality of objects to be controlled execute time-sharingly the control operations; therefore, it is sufficient that each control unit executes its own control. Thus, the processing program procedure is simplified and its reliability increases. In addition, the control operations are time-sharingly performed, so that a collision of the processes does not occur.

Further, various kinds of optical equipment for extension can be easily added to the standard apparatus and a constitution can be also easily changed.

The second embodiment of the present invention will then be described hereinbelow.

The second embodiment also relates to the control system of the copying machine of FIG. 4 similarly to the first embodiment.

Figure 1:
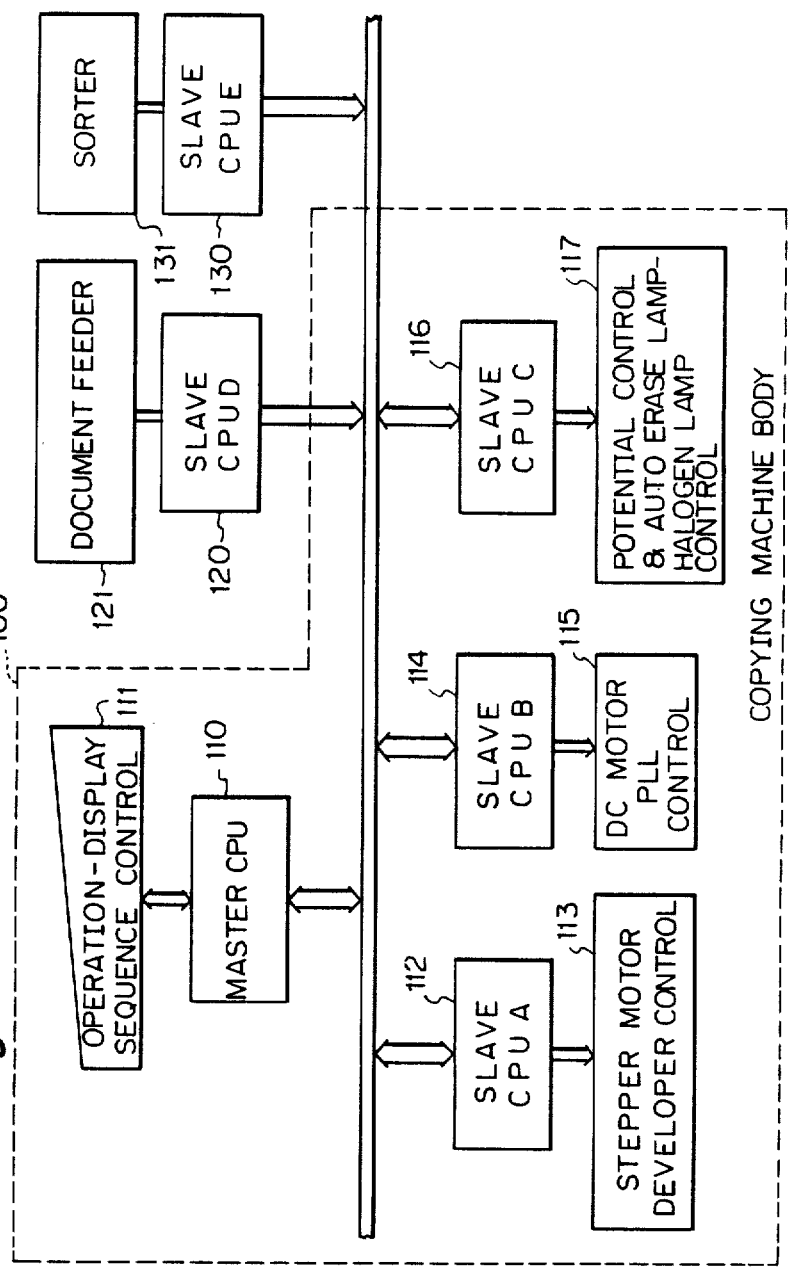
FIG. 1 is a block diagram of a control system in a conventional copying machine.
Figure 2:
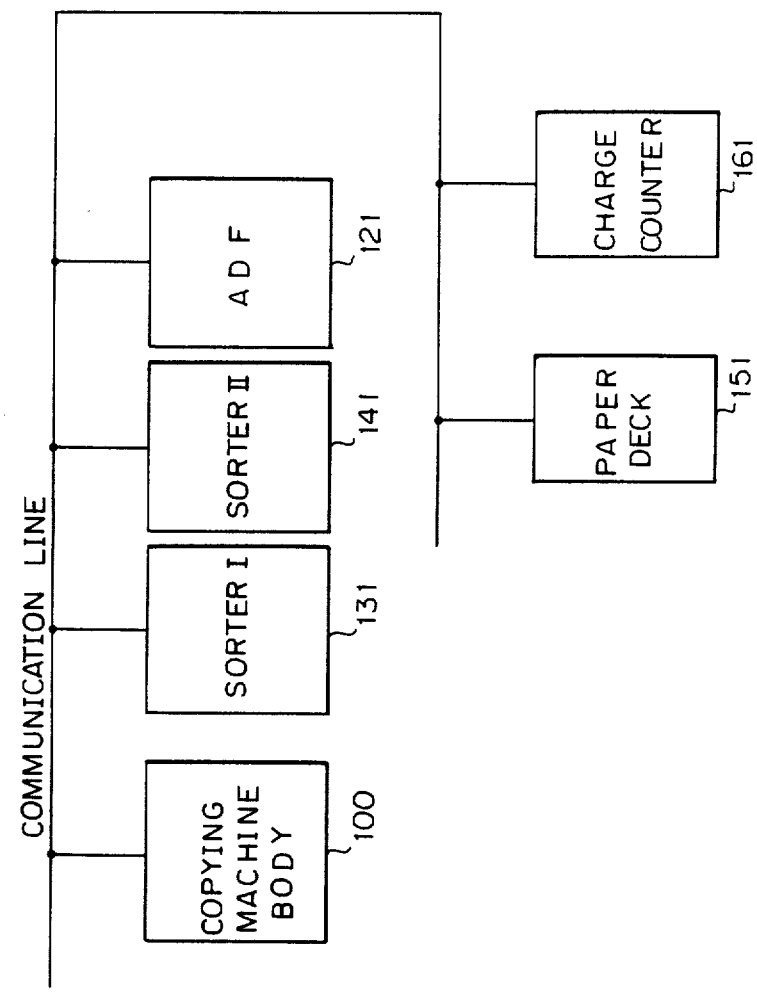
FIG. 2 is a block diagram of a conventional middle-scale copying machine.
Figure 11A:
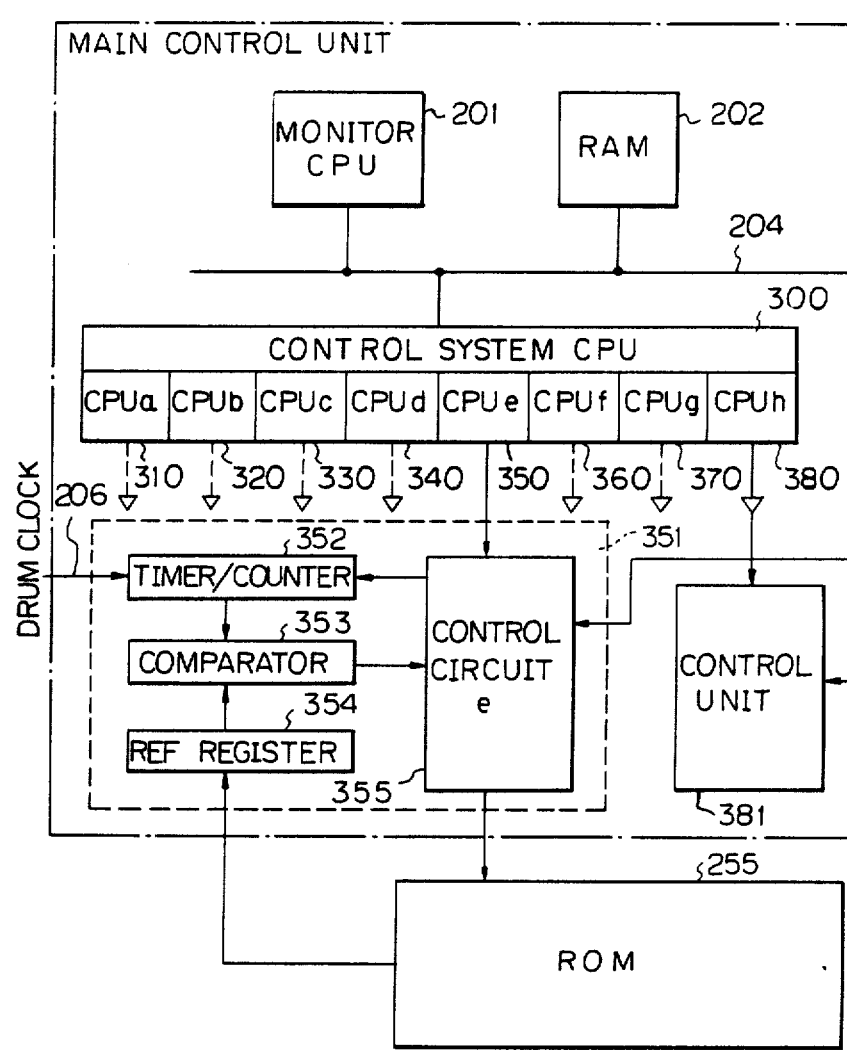
FIG. 11, consisting of FIG. 11A and FIG. 11B, is a block diagram of a main control unit 200' of the second embodiment.
Figure 11B:
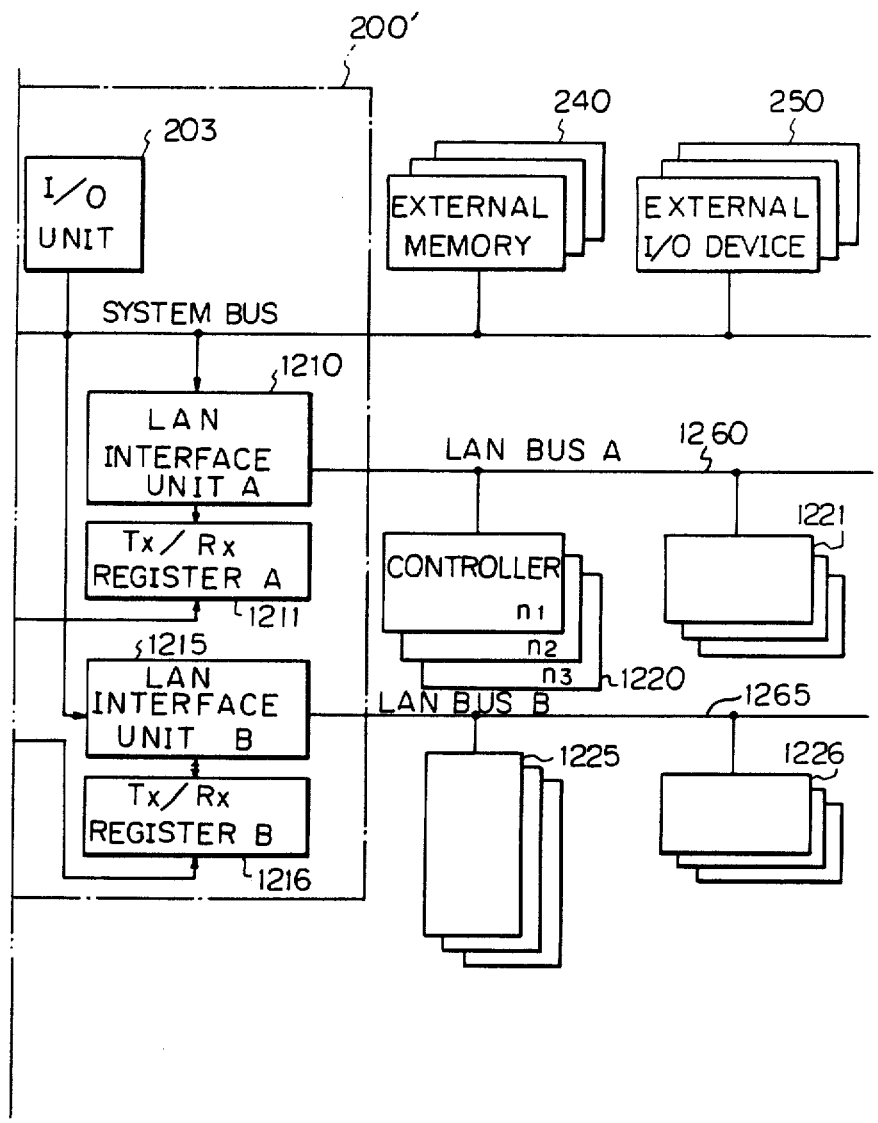

In FIG. 11, the parts and components having the same functions as those shown in FIG. 5 are designated by the same reference numerals In FIG. 11, reference numeral 200' denotes a main control unit of the copying machine, and 1225 and 1226 indicate optional devices which can be connected to the main control unit 200'. The devices 1225 include the sorter-I 131, sorter-II 141, ADF 121, and paper deck 151 shown in FIGS. 2 and 3. The devices 1226 include a reader, an OCR, an OMR, etc. (not shown). These controls and devices as many as only an arbitrary number can be connected for extension to a LAN bus A 1260 from a LAN interface unit A 1210 or a LAN bus B 1265 from a LAN interface unit B 1215 in the main control unit 200.

The LAN interface unit A 1210 serves as an interface among the respective controllers in the system. Reference numeral 1211 denotes a Tx/Rx register A for allowing the control CPU 300 to send control data to the controllers through the LAN interface unit A 1210. Although FIG. 11 shows the state in that the Tx/Rx register A 1211 is connected to only a control unit e 351 provided in the CPU-e 350, it can be also connected to all of the control CPUs together with the LAN interface unit B 1215 which will be explained hereinafter. The LAN interface unit B 1215 serves as an interface among the external devices 1225 and 1226 and transmits data among the control CPU 300 and the external devices through a Tx/Rx register B 1216. Each of the Tx/Rx registers A and B (1211, 1216) comprises 10-bit address register and data register for transmission and 10-bit address register and data register for reception.

In addition to the interface units A and B, the circuits constituting the main control unit 200' are all constituted on a one-chip semiconductor substrate. Silicon may be used as a semiconductor.

To prevent a competition in the case where the control CPU 300 and monitor CPU 201 access the RAM 202 and I/O unit 203, the time when each CPU occupies the system bus 204 is sequentially and time-sharingly set as shown in FIG. 6 in a manner similar to the first embodiment. The CPU-a 310 to CPU-h 380 time-sharingly and cyclically operate in a clockwise manner. In this case, each CPU occupies the system bus 204 for eight μsec and it takes eighty μsec for one rotation. Therefore, when 80 μsec is considered as a unit, the CPU-a 310 to CPU-h 380 operate in parallel The monitor CPU 201 operates in parallel with the control CPU 300 during this period of time. Each of the LAN interface units A 1210 and B 1215 has a control register and a working register (not shown) and also has a function to execute the communication control of data among the controllers and the external devices or the like through the LAN buses A 1260 and B 1265 in accordance with a predetermined protocol. In this embodiment as well, similarly to the first embodiment, a small-scale control CPU 300 is assigned for every execution level of each task process in addition to the monitor CPU 201 and each CPU independently executes the control process. The monitor CPU 201 executes the control of start and stop of the task processes of the respective CPUs of the control CPU 300, designation and change of the execution tasks, etc. Only when requests are generated from respective CPUs, the monitor CPU 201 executes the processes corresponding to the requests.

The relations among the respective CPUs in the main control unit 200' and the LAN interface units A and B (1210, 1215) are substantially the same as those described in FIG. 7.

FIG. 12 shows four representative units as peripheral devices which can be optionally connected to the LAN bus B 1265: namely, the charge counter 234, OCR-/OMR reading apparatus (OCR) 235, auto document feeder (ADF) 236, and sorter 237. These devices are connected through the LAN bus B 1265 in accordance with the control of the LAN interface unit B 1215.

The constitution and control operation of the main motor control 221 shown in FIG. 12 according to the second embodiment are substantially the same as those of the main motor control 221 shown in FIG. 8 in the first embodiment.

Figure 13:
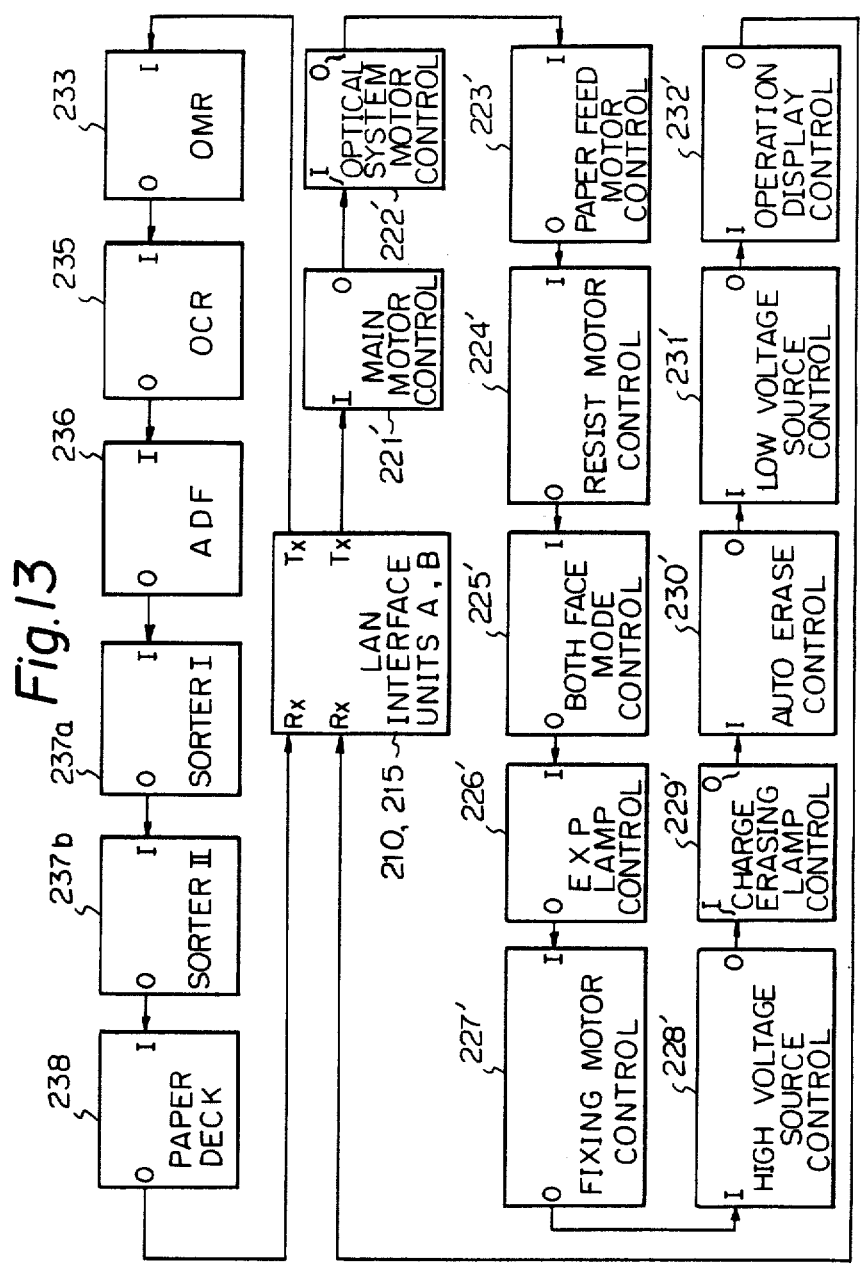
FIG. 13 is a LAN bus arrangement diagram using a daisy chain of the modified form of the second embodiment.

Even in the second embodiment, similarly to the first embodiment, even when one line is connected like a loop by way of the daisy chain system, a similar effect can be obtained if a protocol is predetermined An example of connection by way of the daisy chain system is shown in FIG. 13.

In FIG. 13, a plurality of internal controllers in the main body are connected to the LAN interface unit A 1210 and a plurality of external optional devices to be connected to the main body are connected to the LAN interface unit B 1215.

According to this system, the mutual communication can be realized by way of a single line instead of two lines for transmission and reception.

The control operation of the control through the LAN interface unit A 1210 and LAN bus A 1260, for example, the control operation for the EXP lamp control 226 is similarly performed in accordance with the flowchart of FIG. 10 in the first embodiment.

In the above description, two LAN interfaces for internal and external uses are provided and they can operate synchronously or asynchronously with each other and the system control can be efficiently carried out. In addition, system equipment can be added or deleted without particularly changing the constitution.

As described above, according to the second embodiment of the present invention, it is possible to provide a reliable apparatus in which a quantity of wirings in the system is little and which is not adversely influenced by the other signal lines Also, various kinds of optional equipment for extension can be extremely easily added to the standard apparatus and the constitution can be also easily changed.

In addition, the overhead of the program can be also fairly reduced.

Figures 14, 14A:
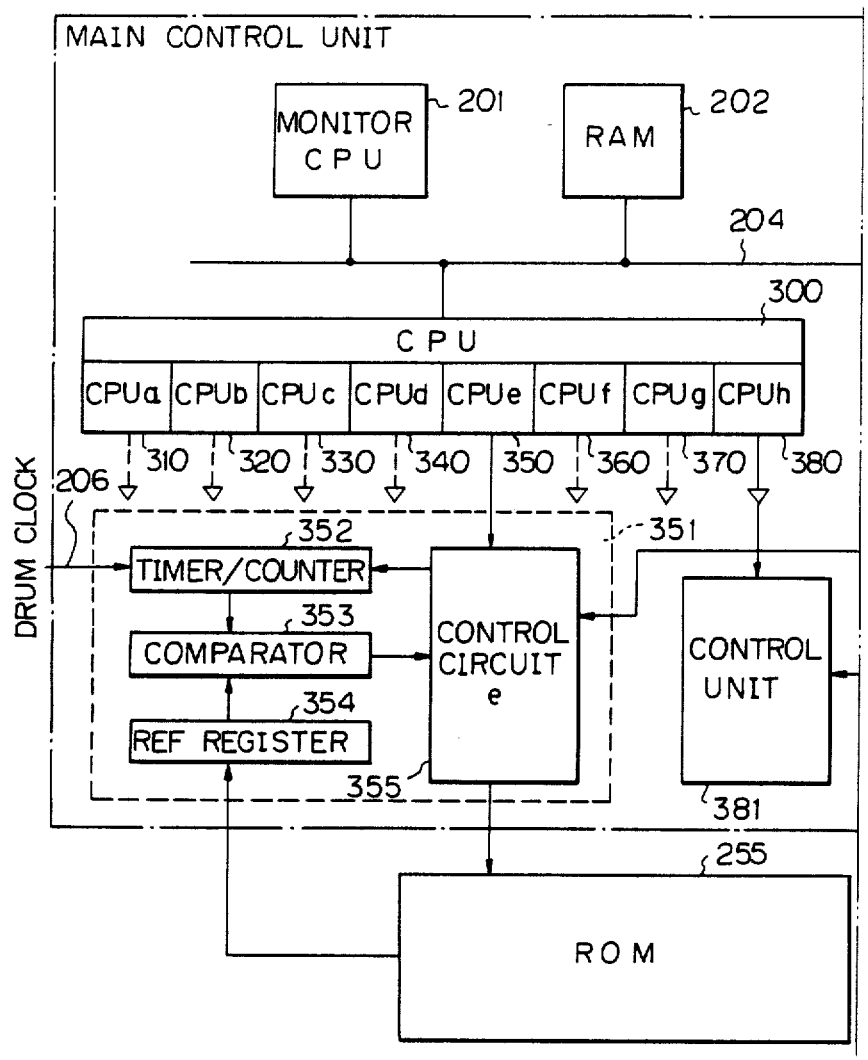
FIG. 14, consisting of FIG. 14A and FIG. 14B, is a block diagram of a main control unit 200" of the third embodiment.
Figure 14B:
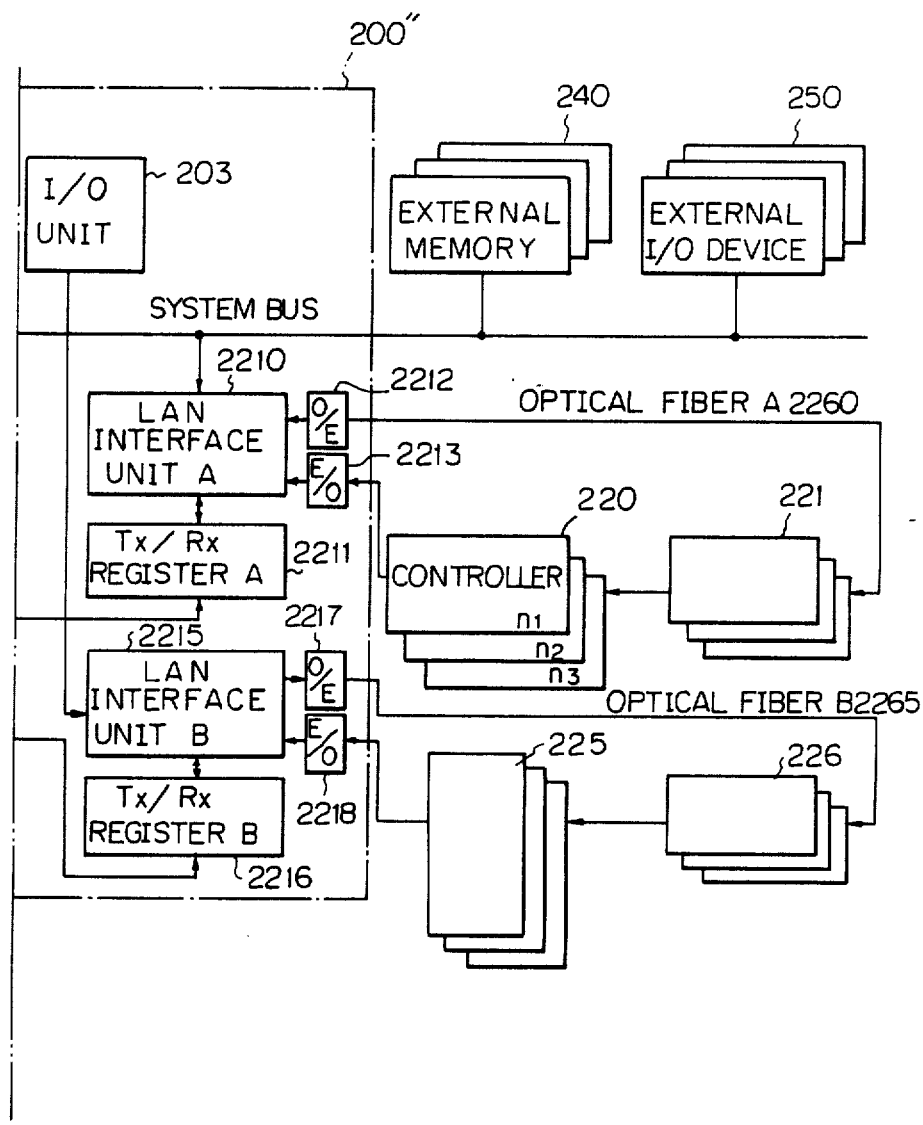

Next, FIG. 14 shows a block diagram of a control function of the third embodiment of the present invention.

In FIG. 14, the parts and components having the same functions as those shown in FIGS. 5 and 11 are designated by the same reference numerals. In the diagram, a reference numeral 200" denotes a main control unit of the copying machine External controllers and devices as many as only an arbitrary number can be connected for extension to an optical fiber A 2260 from an electrical-optical converting unit (hereinafter, referred to as E/0) A 2213 of a LAN interface unit A 2210 or an optical fiber B 2265 from an E/0 B 2218 of a LAN interface unit B 2215 in the main control unit 200".

In the main control unit 200", the LAN interface unit A 2210 serves as an interface among the controllers in the system. A reference numeral 2211 denotes a Tx/Rx register A for allowing the control CPU 300 to send control data to the controllers through the LAN interface unit A 2210. Although FIG. 14 shows the state in that the Tx/Rx register 2211 is connected to only the control unit e 351 provided in the CPU-e 350, it can be connected to all control CPUs together with the LAN interface unit B 2215 which will be explained hereinafter. The LAN interface unit B 2215 serves as an interface among the external devices 225 and 226 and transmits data among the control CPU 300 and the external devices through a Tx/Rx register B 2216. Each of the Tx/Rx registers A and B (2211 and 2216) comprises 10-bit address register and data register for transmission and 10-bit address register and data register for reception. Numerals 2212 and 2217 indicate optical-electrical converting units (hereinafter, referred to as 0/E) A and B which receive optical data from the optical fibers A 2260 and B 2265 and convert to electrical signals. Numerals 2213 and 2218 denote the E/0 A and E/0 B to convert data transmitted from the LAN interface units A 2210 and B2215 to optical communication data.

As well as the 0/E and E/0, the circuits constituting the main control unit 200" are all together constituted on a one-chip semiconductor substrate. Silicon or gallium may be used as a semiconductor.

To prevent a competition in the case where the control CPU 300 and monitor CPU 201 access the RAM 202 and I/O unit 203, the time when each CPU occupies the system bus 204 is sequentially and time-sharingly set as shown in FIG. 6 in a manner similar to the first and second embodiments. The CPU-a 310 to CPU-h 380 time-sharingly and cyclically operate in a clockwise manner. In this case, each CPU occupies the system bus 204 for eight μsec and it takes eighty μsec for one rotation. Therefore, when 80 μsec is considered as a unit, the CPU-a 310 to CPU-h 380 operate in parallel. The monitor CPU 201 operates in parallel with the control CPU 300 during this period of time.

Each of the LAN interface units A 2210 and B 2215 has a control register and a working register (not shown) and also has a function to control the data communication among the controllers and the external devices or the like through the optical fibers A 2260 and B 2265 in accordance with a predetermined protocol. In this embodiment, in addition to the monitor CPU 201, the small-scale control CPU 300 is assigned for every execution level of each task process. Each CPU independently executes the control process. The monitor CPU 1 executes the control of start and stop of the task processes of the respective CPUs of the control CPU 300, designation and change of the execution tasks, etc. Only when requests are generated from the respective CPUs, the monitor CPU 201 executes the processes corresponding to the requests.

The main control unit 200'' is integrally constituted in a leadless package and its external views are shown in FIGS. 15A to 15D.

Figure 15A:
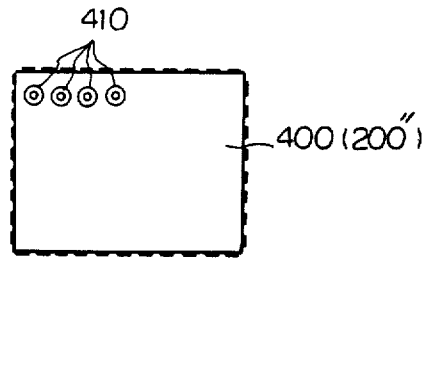
FIGS. 15A to 15D are external views of the integrated main control unit of the third embodiment.
Figure 15C:
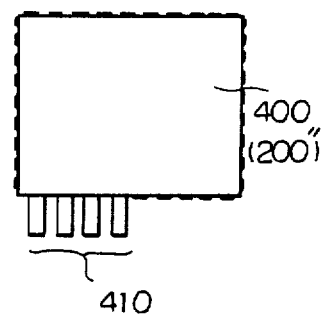
Figure 15B:
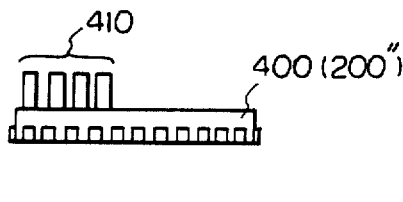

FIG. 15A is a top plan view of the integrated leadless package of the main control unit 200'' and FIG. 15B is a front view of the same, in which reference numeral 400 denotes a lead package chip and 410 indicates optical fiber connectors. Two pairs of optical connectors are included on the top surface of the leadless package as shown in FIGS. 15A and 15B.

Figure 15D:
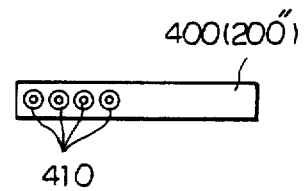

FIGS. 15C and 15D show an example whereby the optical fiber connectors 410 are arranged on the side surface instead of the top surface of the leadless package 400. FIG. 15C is a top plan view and FIG. 15D is a front view.

The relations among the CPUs and the LAN interface units A and B (2210, 2215) in the main control unit 200'' will be described.

As shown in FIG. 14, the 0/E A 2212, 0/E B 2217, E/0 A 2213 and E/0 B 2218 are one-chipped in the main control unit 200'' so that the optical communication can be performed and each of these converters is equipped with a light emitting diode (LED) consisting of the gallium arsenide (GaAs) system, thereby allowing the signals in the chip to be directly converted. On the other hand, an avalanche photodiode (APD) serving as a photosensing device is likewise one-chipped. The main control unit (controller) in this invention has a feature such that the abovementioned optical integrated circuit and VLSI are integrated and one-chipped in the same package or as a VLSI consisting of gallium system.

The main control unit 200'' is connected to other controllers by way of the daisy chain system. Each controller once performes the O/E conversion and decodes the address and takes in data if it is the transmission data to the self-unit. Then, the controller executes the process corresponding to the data taken. In the case where the data is the data to the other controller, it is immediately E/O converted and sent to the next controller (unit).

Due to this, even when the distance between the controllers is long, there is no need to insert any special amplifier and the system can sufficiently cope with a light attenuation.

Figure 16B:
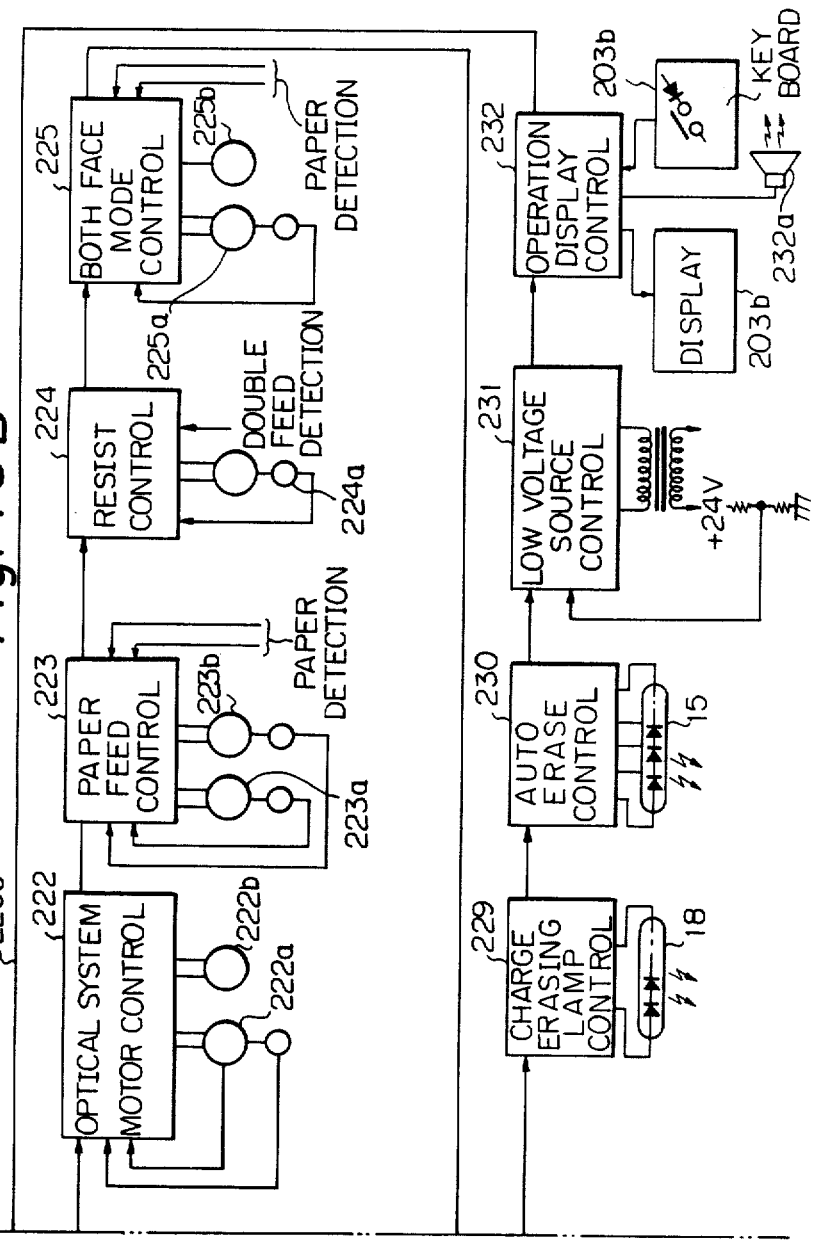
FIG. 16, consisting of FIG. 16A and FIG. 16B, is an arrangement diagram of each control system of the third embodiment.

FIG. 16 is an arrangement diagram of the objects to be controlled which were connected to the main control unit through the optical fibers A 2260 and B 2265 of this embodiment. The objects to be controlled of the copying machine are divided into twelve blocks and the controller in each block is connected through the optical fiber.

This optical fiber uses the daisy chain system in which the optical output from the LAN interface A 2210 or B 2215 sequentially circulates through the respective controllers and is inputted to the LAN controller.

In FIG. 16, the main motor control 221 controls the main motor 221a of the copying machine. The main motor 221 a drives the conveying system of the photo sensitive drum 20. In this example, a DC servo motor is used as a main motor. In addition, the timing clock pulse (drum clock) signal 206 is generated synchronously with the rotation of the drum 20 and sent to the timer/counter (e.g., 352) in the LAN interface unit A 2210. The optical system motor control 222 controls the scan motor 222a of an original serving as a servo motor and the pulse motor 222b to set a magnification. The positions and speeds of those motors are controlled by the motor control 222 on the basis of the data from the control CPU 300 of the main control unit 200. Before the copy operation is started, a variable magnification (reduction, enlargement, zoom) is set by the pulse motor 222b on the basis of a command from the control CPU 300. A value of the magnification is instructed and inputted by the user from the operating section.

The paper feed control 223 controls the DC motor 223a or 223b to rotate the paper feed roller 21 or 23 at a predetermined timing and also detects the presence or absence of the papers in the paper feed cassette 22 or 24, the paper jam, etc. and transmits the detection data to the control CPU 300. The resist control 224 controls the resist motor 224a to drive the resist rollers 30, controls the image edge resist of the image on the surface of the drum 20 and transfer paper, controls the bending (loop) of the paper, and detects the double feed (i.e., two papers are simultaneously fed). In the case where the user sets the both-fach copy mode, the papers of which the one-side copy has been completed as described above are sent to the intermediate cassette 26. The both-face mode control 225 controls the intermediate paper feed roller motor 225a to drive the paper feed roller 25 to feed the papers from the intermediate cassette 26 upon completion of the one-side copy of the papers as many as a specified quantity, thereby feeding the transfer papers. The both-face mode control 225, on one hand, drives the guide plate control solenoid 225b to control the direction of the guide plate 34 and also detects the presence or absence (paper jam, presence or absence of the papers) of the papers in the both-face copy mode.

The EXP lamp control 226 stabilizes a light quantity of the halogen lamp 3 and controls the light adjustment. A light quantity of the halogen lamp 3 is detected by the photosensor 226a. The photo sensor 226a is arranged on the side surface of the lamp 3 and continuously monitors the brightness of the lamp 3. The fixing heater control 227 controls a heating temperature of the fixing heater 33a of the fixing unit 33. This temperature is detected by the thermistor 227a arranged near the fixing heater 33a. A driving electric power of the heater 33a is controlled in accordance with the temperature detected. The high voltage source control 228 measures the detection potential of the surface potential sensor 16 arranged near the surface of the drum 20 and controls the voltages of the charge corona 13, transfer corona 14, and bias voltage source BI 228a so that the surface potential of the drum 20 becomes constant in both bright and dark portions. The charge eraser lamp control 229 controls an irradiation amount of the charge eraser lamp 18 to erase the charges of the drum surface. In the case where the image on the drum surface is not transferred onto the transfer paper due to occurrence of the paper jam upon feeding of the paper in the transfer unit or the like, or in other similar case, the irradiation amount from the charge eraser lamp 18 is increased, thereby irradiating a high power light onto the surface of the photosensitive drum 20.

The auto erase control 230 controls the area where the erase lamp 15 is lit on in accordance with a size of the transfer paper to be copied and with a variable magnification and erases the charges in the area other than the image transfer area of the drum surface, thereby preventing the toner from being deposited onto the surface in the non-transfer area. The low voltage source control 231 regulates the power source voltage of DC 24 V and monitors an abnormal value such as an excessive current, and the like. The operation-display control 232 serves as a man-machine interface and controls the key inputs from the keyboard 203a of the I/O unit 203 through the control CPU 300 and LAN interface unit A 2210, the display of the display unit 203b, and an audio output from the audio output unit 232a using the audio synthesizer included in the control 232.

In this embodiment, four representative units are shown as optional peripheral devices which can be connected to the optical fiber B 2265 from the LAN interface unit B 2215: namely, the charge counter 234, OCR/OMR reading apparatus (OCR) 235, auto document feeder (ADF) 236, and sorter 237. These units are connected to the optical fiber B 2265 in accordance with the control of the LAN interface B 2215.

Figure 17:
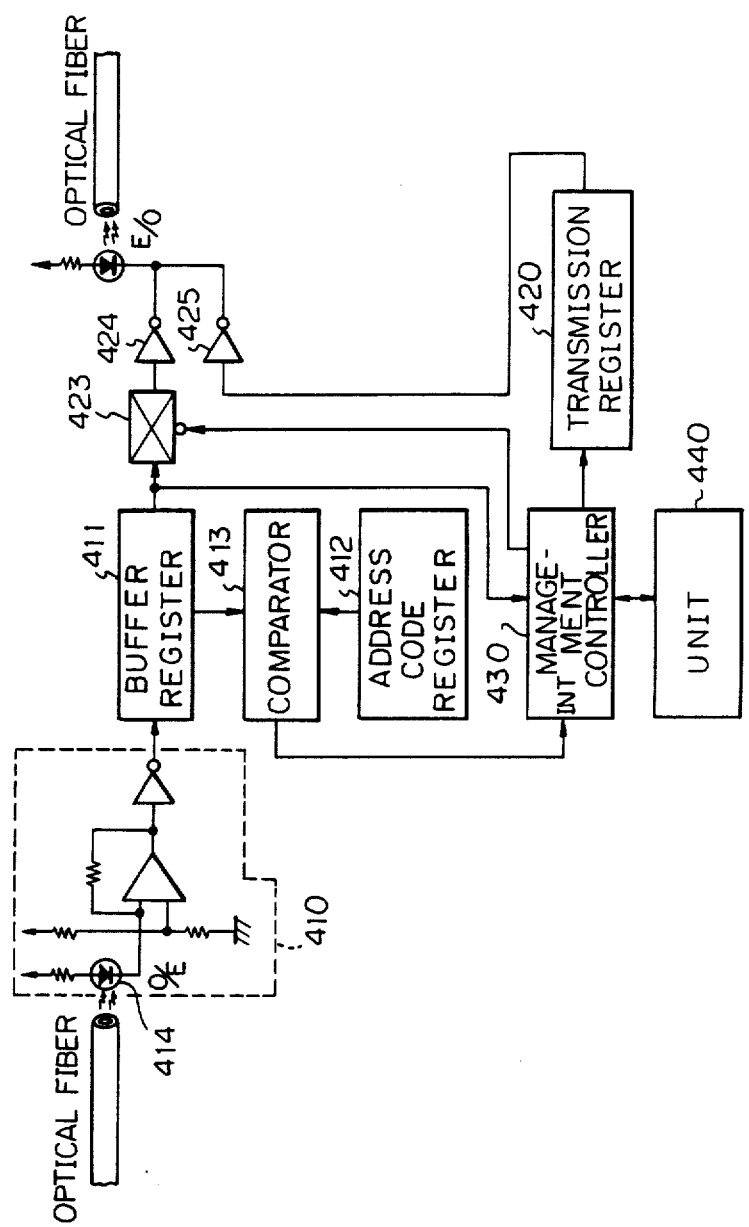
FIG. 17 is a block arrangement diagram of a transmission control unit of a controller of the third embodiment.

FIG. 17 shows a block diagram of the transmission control unit from the optical communication medium in the control unit shown in FIG. 16.

In FIG. 17, a reference numeral 410 denotes a photosignal receiving unit. An avalanche photodiode (APD) 414 in the unit 410 always receives optical communication data transmitted through the optical fiber and photo-electric converts it to an electrical signal. This signal is sequentially stored into the buffer register 411.

An address code value set in the address code register 412 to set and hold an address value which is peculiar to the self-control and an address code value in the communication data stored in the buffer register 411 are compared by the comparison register 413. When those values do not coincide, an LED 426 is turned on to emit the light by way of an analog switch 423 (which is normally open) and a buffer 424, thereby transmitting data from the buffer register 411 to the next controller.

When it is determined in the comparison register 413 that the address code values coincide, an interruption request is outputted to a management controller 430, thereby setting the data take-in mode of the data of the transmission frame in which the address code to the self-control was set and which was received in the buffer register 411. The analog switch 423 is closed and the reception data is taken out from the buffer register 411. A unit 440 is controlled in accordance with this reception data.

In the case where data which is transmitted to the control CPU 300 exists for the reception date, this transmission data is set into the transmission register 420. The content of the transmission register 420 is transmitted to the control CPU 300 through a buffer 425 by turning on the LED 426 to emit the light. For the transmission data, there are two kinds of data: one is the data indicative of a request for transmission (for example, status data of the control system) which is transmitted in the case where, e.g., a request for transmission of a constant data is generated from the control CPU 300; and the other is the data indicative of the abnormal state which is transmitted in the case where some accidents occurred.

In this manner, only when the transmission frame to the self-control is sent, a request for reception of the communication data to the self-apparatus is generated to the management controller. Therefore, the management controller does not need to monitor the communication data to other controls during that period of time but can execute only its own control process.

The E/O and O/E converting units in the transmission control unit and the management controller are constituted as a one-chip monolithic LSI and are loaded in the unit of each object to be controlled.

On one hand, it is sufficient that the control CPU 300 also controls only the controller which was set and specified in the Tx/Rx register A 2211 or B 2216. Therefore, the control CPU 300 can execute only its own task process without taking account of interruption request processes from other controllers or the like, so that the processing program procedure is also simplified and its reliability is improved.

In addition, each CPU has a common register and performs the readout operation from and writing operation into a memory and also the transmission and reception of data among the CPUs. As shown in FIG. 6, however, each CPU time-sharingly and cyclically operates, so that a collision of the processes of the CPUs does not occur and the program can be easily constituted. Therefore, for example, when the CPU-e 350 intends to deliver the papers to a stacker of the sorter at a certain timing, by storing the corresponding data into the common register, the CPU h 380 reads out a command from the common register 3 μsec after the operation of the CPU-e 350 and can give the command to the LAN interface unit B 2215.

On the contrary, when the operator which is operating an external device instructs the copy start from the external device by way of, e.g., an OMR, this instruction data is received by the LAN interface unit B 2215 and stored into the register to load the copy mode under management of the CPU-h 380. The CPU-e 350 reads this data and can execute the operation in the copy mode.

In the main motor control 221 with the arrangement shown in FIG. 17, the management controller controls the main motor in a PLL control manner and outputs a start/stop signal of the main motor 221a, thereby controlling the rotating time of the motor 221a. The management controller also rotates the motor under the PLL control in response to the start/stop signal and receives a clock pulse signal to control the speed and position which is generated from the speed control encoder 221b in correspondence to the rotation of the motor, thereby keeping the rotating speed of the motor constant.

On the other hand, the drum clock pulse 206, which is generated synchronously with the rotation of the photosensitive drum 20, is generated from the encoder 221c arranged at the other end of the main motor 221a and inputted to the main control unit 200" through another sole signal line different from the optical fiber and inputted to the timer/counter 352 or the like.

The control operation of the control through the LAN interface unit A 2210 and optical fiber, for example, the control operation for the EXP lamp control 226 is executed in accordance with a flowchart of FIG. 10 in a manner similar to the first and second embodiments.

As described above, the main control unit 200 can be connected with the other controls by way of only a single optical fiber (optical communication medium).

In this embodiment, on one hand, the peripheral devices (234 to 237) are also controlled by the main control unit 200" through the optical fiber from the LAN interface unit B 2215 in a similar manner.

Although the control by way of the daisy chain system has been described in the above, the processing speed can be also improved by separately providing two optical fibers from the main control unit 200" for transmission and reception. Although the cost slightly increases in this case, a transmitting efficiency is improved and transmission control is also simplified.

Figure 18:
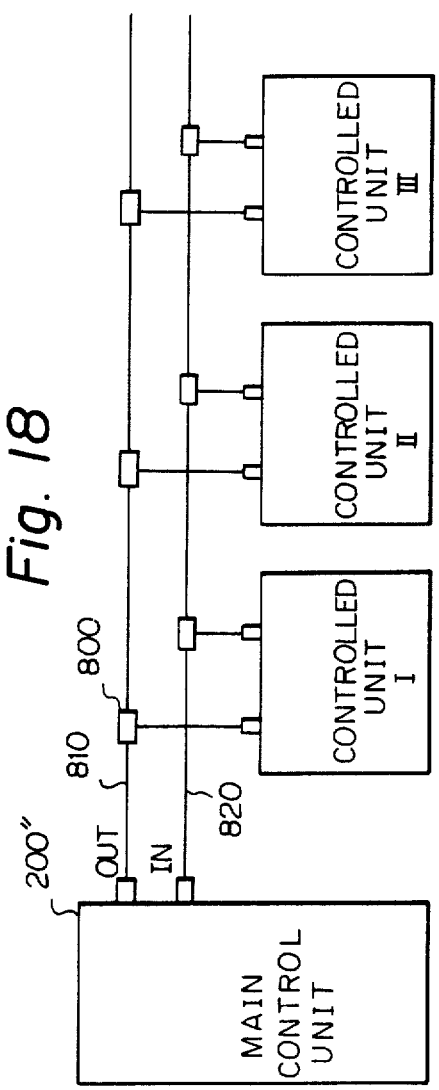
FIG. 18 is a connection arrangement diagram of optical fibers of the modified form of the third embodiment.

FIG. 18 shows an example whereby two optical fibers are used.

In the diagram, reference numeral 800 denotes a photobranch connector, 810 is a transmitting optical fiber of the main control unit 200", and 820 is a receiving optical fiber of the unit 200". As shown in the diagram, data is transmitted among the main control unit 200" and controllers units to be controlled) using two optical fibers.

Figure 19:
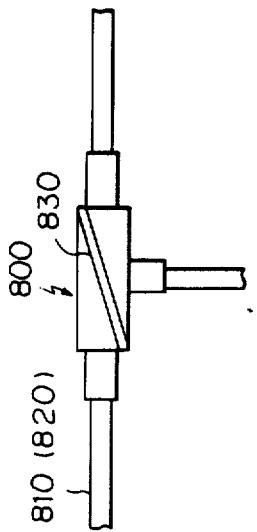
FIG. 19 is a structural diagram of a photo branch connector.

FIG. 19 shows a detailed arrangement of each photobranch connector of the optical fibers used in FIG. 18.

In the diagram, numerals 810 and 820 are similar to the optical fibers 810 and 820 shown in FIG. 18 and 830 denotes a half mirror included in the photobranch connector. This half mirror may be replaced by a prism.

Each control unit and peripheral device can independently control objects to be controlled on a unit basis and even if the communication from the main control unit 200" stops for a short time, they can perform the standard control (fail-safe).

In association with this stop of communication, an error during this period increases in the case of an equipment having a very high processing speed. However, an influence by such error can be almost ignored in the case of an equipment with a middle operating speed (e.g., the copying capability is below forty papers per minute) or the like.

In the above description, two LAN interfaces are provided for both internal and external uses and they can operate synchronously and asynchronously with each other and can efficiently control the system. In addition, other system equipment can be easily added or deleted without particularly changing the arrangement.

On the other hand, one of the LAN interfaces may be simply used as an extension port for I/O. In this case, there is no need to connect those LAN interfaces by the optical fiber but this extension port may be used as an ordinary interface.

As described above, according to the third embodiment, by controlling the circuits and devices in and out of the copying machine body by way of the LAN control using the optical fibers, the harness can be simplified and disturbance due to the noise can be improved. Further, the effective control system can be constituted by the controller based on the new concept in which a photointegrated circuit was integrally formed.

Although the middle-speed copying machine has been described as an example in the first, second and third embodiment, the present invention can be applied to other image forming apparatuses such as a printer, display device, or the like, or a general control system having a plurality of objects to be controlled.

As described above, according to the present invention, a plurality of control units which independently and respectively control a plurality of objects to be controlled execute time-sharingly the control operations. Therefore, each control unit can perform its own control, so that the processing program procedure is simplified and its reliability for control is also improved. A collision of processes does not occur.

Further, since the transmission control unit is integrally constituted with those plurality of control units, it is possible to obtain a reliable system in which a quantity of wirings in the control system is little. Also, various kinds of optional equipment for extension can be extremely easily added to the standard apparatus and a constitution can be also easily changed.

Also, the overhead of the program can be fairly reduced.

The present invention is not limited to the foregoing embodiments but many modifications and variations are possible within the spirit and scope of the appended claims of the invention.

We claim:

1. A control system of an image forming apparatus having a plurality of objects to be controlled, comprising:
a control unit comprising a plurality of execution means for respectively executing control programs wherein a parallel operation is required to control said plurality of objects; and
a monitor control unit to monitor said control unit,
wherein said plurality of execution means of said control unit sequentially operate and said plurality of control programs are executed on a time-sharing basis.

2. A control system according to claim 1, wherein said control limit cyclically selects and executes said plurality of control programs.

3. A control system according to claim 1, wherein said control unit and said monitor control unit are integrally formed on a semiconductor substrate.

4. A control system according to claim 1, further having a system bus which is commonly connected to said control unit and said monitor control unit.

5. A control system according to claim 4, wherein said control unit and said monitor control unit occupy said system bus one by one on a time-share basis.

6. A control system according to claim 5, wherein said monitor control unit operates in parallel with said control unit.

7. A control system according to claim 1, wherein said execution means has a register unit for temporarily storing data and a timer unit for performing a timing operation.

8. A control system according to claim 1, further having a transmission control unit for allowing control data, to control external devices, to be sent from said control unit.

9. A control system according to claim 8, wherein said transmission control unit has a function to receive the data sent from said external devices.

10. A control system according to claim 1, wherein said image forming apparatus is a copying apparatus.

11. A control system for controlling an image forming apparatus having a plurality of objects to be controlled, comprising:
- a control unit comprising a plurality of execution means respectively provided for executing a plurality of control programs, wherein a parallel operation is required to control said plurality of objects;
- a transmission control unit to allow control data to be transmitted and received among said control unit and external control executing units; and
- a monitor control unit to monitor said control unit and said transmission control unit,
- wherein said control unit, said transmission control unit, and said external control executing units are integrally formed on a semiconductor substrate, and
- wherein said plurality of execution means of said control unit sequentially operate and said plurality of control programs are executed on a time-sharing basis.

12. A control system according to claim 11, wherein silicon or gallium is used as said semiconductor substrate.

13. A control system according to claim 11, wherein said transmission control unit consists of electrical-optical converting means and optical-electrical converting means for performing light transmission.

14. A control system according to claim 13, wherein a light emitting unit of a gallium arsenide system is used as said electrical-optical converting means.

15. A control system according to claim 13, wherein an avalanche photodiode is used as said optical electrical converting means.

16. A control system according to claim 11, wherein said image forming apparatus is a copying apparatus.

17. A control system comprising:
- a control unit having a plurality of execution means respectively provided for executing a plurality of control programs, wherein a parallel operation is required to control a plurality of objects and said plurality of execution means are operated on a time-sharing basis;
- a plurality of transmission lines to transmit data to control said plurality of execution means;
- a plurality of input/output interface units provided for each of said plurality of transmission lines; and
- a central control unit to control said plurality of input/output interface units, wherein said plurality of execution means of said control unit sequentially operate and said plurality of control programs are executed in said time-sharing basis.

18. A control system according to claim 17, wherein said control unit is divided into an internal control executing unit to perform a control inside an apparatus and an external control executing unit to perform a control outside the apparatus, and said input/output interface units include an input/output interface for said internal control executing unit and an input/output interface for said external control executing unit.

19. A control system according to claim 17, wherein said input/output interface units consist of electrical-optical converting means and optical-electrical converting means, and an optical fiber cable is used as said transmission line.

20. A control system according to claim 17, wherein said input/output interface units and said central control unit are integrally formed on a same semiconductor substrate.

21. A control system according to claim 18, wherein said control system is a control system regarding an image formation.

22. A control system according to claim 1, wherein each of said execution means is adapted to control any one of said plurality of objects in accordance with the control program executed thereby.

23. A control system according to claim 11, wherein each of said execution means is adapted to control any one of said plurality of objects in accordance with the control program executed thereby.

24. A control system according to claim 17, wherein each of said execution means is adapted to control any one of said plurality of objects in accordance with the control program executed thereby.

* * * * *

UNITED STATES PATENT AND TRADEMARK OFFICE
CERTIFICATE OF CORRECTION

PATENT NO. : 4,980,814
DATED : December 25, 1990
INVENTOR(S) : MASAO HOSAKA ET AL.   Page 1 of 2

It is certified that error appears in the above-identified patent and that said Letters Patent is hereby corrected as shown below:

COLUMN 6

Line 14, "stocked" should read --stacked--.

COLUMN 7

Line 35, "one-198 chip" should read --one-chip--.
　　　Line 64, "then" should read --now--.

COLUMN 9

Line 58, "then" should read --now--.

COLUMN 11

Line 5, "control 226 The" should read
　　　　　　--control 226. The--.
　　　Line 7, "then" should read --now--.
　　　Line 55, "set" should read --sets--.

COLUMN 12

Line 39, "then" should read --now--.

COLUMN 15

Line 19, "CPU 1" should read --CPU 201--.

COLUMN 16

Line 45, "both-fach" should read --both-face--.

UNITED STATES PATENT AND TRADEMARK OFFICE
CERTIFICATE OF CORRECTION

PATENT NO. : 4,980,814
DATED : December 25, 1990
INVENTOR(S) : MASAO HOSAKA ET AL.                Page 2 of 2

It is certified that error appears in the above-identified patent and that said Letters Patent is hereby corrected as shown below:

COLUMN 18

Line 2, "date," should read --data,--.

COLUMN 19

Line 34, "controlled)" should read --controlled--.

COLUMN 20

Line 46, "control limit" should read --control unit--.

Signed and Sealed this

Eighteenth Day of August, 1992

Attest:

DOUGLAS B. COMER

Attesting Officer     Acting Commissioner of Patents and Trademarks